(12) United States Patent
Abu Qahouq

(10) Patent No.: US 11,063,478 B2
(45) Date of Patent: Jul. 13, 2021

(54) WIRELESSLY DISTRIBUTED AND MULTI-DIRECTIONAL POWER TRANSFER SYSTEMS AND RELATED METHODS

(71) Applicant: THE BOARD OF TRUSTEES OF THE UNIVERSITY OF ALABAMA, Tuscaloosa, AL (US)

(72) Inventor: Jaber A. Abu Qahouq, Tuscaloosa, AL (US)

(73) Assignee: THE BOARD OF TRUSTEES OF THE UNIVERSITY OF ALABAMA, Tuscaloosa, AL (US)

(*) Notice: Subject to any disclaimer, the term of this patent is extended or adjusted under 35 U.S.C. 154(b) by 339 days.

(21) Appl. No.: 16/306,160

(22) PCT Filed: May 30, 2017

(86) PCT No.: PCT/US2017/034964
§ 371 (c)(1),
(2) Date: Nov. 30, 2018

(87) PCT Pub. No.: WO2017/210170
PCT Pub. Date: Dec. 7, 2017

(65) Prior Publication Data
US 2020/0328622 A1   Oct. 15, 2020

Related U.S. Application Data

(60) Provisional application No. 62/343,113, filed on May 30, 2016.

(51) Int. Cl.
*H02J 50/80* (2016.01)
*B60L 53/12* (2019.01)
(Continued)

(52) U.S. Cl.
CPC .............. *H02J 50/80* (2016.02); *B60L 50/60* (2019.02); *B60L 53/12* (2019.02); *B60L 53/126* (2019.02);
(Continued)

(58) Field of Classification Search
CPC ...................................................... H02J 50/80
(Continued)

(56) References Cited

U.S. PATENT DOCUMENTS 9,368,991 B2   6/2016 Qahouq
2009/0067208 A1   3/2009 Martin et al.
(Continued)

FOREIGN PATENT DOCUMENTS

KR   20150112653 A   10/2015

OTHER PUBLICATIONS

Supplementary European Search Report, issued in corresponding application No. EP 17 80 7321, dated Oct. 24, 2019, 9 pages.
(Continued)

*Primary Examiner* — Jerry D Robbins
(74) *Attorney, Agent, or Firm* — Meunier Carlin & Curfman LLC

(57) ABSTRACT

Wirelessly distributed and multi-directional power transfer systems and related methods are described herein. An example system for distributing power across a wireless medium can include a plurality of wireless modular power packs connected across a wireless medium to a wireless power receiver circuit that is connected to a load. Each wireless modular power pack can include a respective wireless power transmission circuit directing a respective wireless power signal to the wireless power receiver circuit. The system can also include a power source positioned within each of the wireless modular power packs. Each power source transmits a respective power signal across an
(Continued)

internal power interface to a respective wireless power transmission circuit within a respective wireless modular power pack.

29 Claims, 22 Drawing Sheets

(51) Int. Cl.

| | | |
|---|---|---|
| *B60L 50/60* | (2019.01) | |
| *H01F 38/14* | (2006.01) | |
| *H02J 50/10* | (2016.01) | |
| *H02J 50/40* | (2016.01) | |
| *B60L 53/20* | (2019.01) | |
| *B60L 53/54* | (2019.01) | |
| *B60L 53/126* | (2019.01) | |
| *B60L 53/51* | (2019.01) | |
| *B60L 53/53* | (2019.01) | |
| *B60L 53/55* | (2019.01) | |
| *B60L 53/62* | (2019.01) | |
| *B60L 53/66* | (2019.01) | |
| *B60L 58/12* | (2019.01) | |
| *B60L 58/16* | (2019.01) | |
| *B60L 53/52* | (2019.01) | |
| *H02J 7/00* | (2006.01) | |
| *H02J 7/02* | (2016.01) | |

(52) U.S. Cl.
CPC ............... *B60L 53/20* (2019.02); *B60L 53/51* (2019.02); *B60L 53/52* (2019.02); *B60L 53/53* (2019.02); *B60L 53/54* (2019.02); *B60L 53/55* (2019.02); *B60L 53/62* (2019.02); *B60L 53/66* (2019.02); *B60L 58/12* (2019.02); *B60L 58/16* (2019.02); *H01F 38/14* (2013.01); *H02J 7/005* (2020.01); *H02J 7/0048* (2020.01); *H02J 7/02* (2013.01); *H02J 50/10* (2016.02); *H02J 50/40* (2016.02); *H02J 2207/20* (2020.01)

(58) Field of Classification Search
USPC .......................................................... 320/108
See application file for complete search history.

(56) References Cited

U.S. PATENT DOCUMENTS

| | | | |
|---|---|---|---|
| 2011/0127954 A1 | 6/2011 | Walley et al. | |
| 2012/0187772 A1* | 7/2012 | Teggatz | H04B 5/0031 307/104 |
| 2012/0206096 A1* | 8/2012 | John | H02J 50/10 320/108 |
| 2013/0031377 A1 | 1/2013 | Sultenfuss et al. | |
| 2014/0354064 A1 | 12/2014 | Tseliakhovich | |
| 2015/0145336 A1* | 5/2015 | Paquin | H02J 7/34 307/52 |
| 2016/0077503 A1 | 3/2016 | Carter | |
| 2016/0099600 A1* | 4/2016 | Ho | H02J 50/80 320/108 |
| 2018/0035383 A1* | 2/2018 | Cavallaro | H04W 52/0251 |

OTHER PUBLICATIONS

International Search Report and Written Opinion Issued in related International Application No. PCT/US2017/034964 dated Oct. 12, 2017.
Communication pursuant to Article 94(3) EPC issued in corresponding EP 17807321.9, dated May 10, 2021.

* cited by examiner

WIRELESSLY DISTRIBUTED AND MULTI-DIRECTIONAL POWER TRANSFER SYSTEMS AND RELATED METHODS

CROSS-REFERENCE TO RELATED APPLICATIONS

This application is a national stage application filed under 35 U.S.C § 371 of PCT/US2017/034964 filed May 30, 2017, which claims the benefit of U.S. provisional patent application No. 62/343,113, filed on May 30, 2016, and entitled "Wirelessly Distributed and Multi-Directional Power Transfer System," the disclosures of which are expressly incorporated herein by reference in their entireties.

BACKGROUND

Electric Vehicles (EVs) and similar applications have the major issue of needing increasingly longer times to charge their batteries. For example, eight hours of charge might be needed in order to dive a full size EV for three hours. Research and development has been focusing on developing batteries and systems with faster charging speed but still long time of charging would be needed, much longer than filling up a conventional fossil fuel based vehicle. Moreover, batteries and systems with faster charging time tend to have shorter lifetime and tend to generate more heat. Other research and development has focused on charging the complete on-board battery pack wirelessly through a charging pad/station placed under or near the EV. While this might provide some convenience compared to having to plug a wire to charge the EV, it does not help in speeding up charging. One solution which has been proposed decades ago is battery pack swapping, which has not deemed practical due to several factors especially: (1) the need for complex electrical (and mechanical) connections (e.g. for power, sensing, and data) between the battery pack and the vehicle, (2) the weight of the battery pack, (3) the safety concern in handling the battery pack, and (4) the need to skilled personnel to do the battery pack swapping. The fact that EVs battery packs cannot be filled (charged) as fast as a conventional fossil fuel vehicle tank can be filled is one of the major reasons for most people to not adopt EVs. It creates EV mileage range anxiety and need to remember to charge anxiety and concerns. The degradation of the battery pack capacity is another concern for users when the battery pack is not easily replaceable and costly.

In addition, electric propulsion based aircrafts have the potential advantage of higher efficiency, which leads to reduced operating cost and lower carbon emissions. This type of aircraft requires an energy source that supplies electric power, as an alternative to fossil fuel. While there might be different methods of supplying electric power/energy to such aircraft, electrochemical battery based energy storage source is likely to be the major solution to most of these aircrafts for many years to come. In this case, the battery would need to be charged as an alternative to filling up with fossil fuel. The charging energy source can be a renewable energy source, such solar or wind energy sources. The challenge in this case (which is partially similar to EVs but different and more challenging at the same time) is the very long time needed to charge the battery. But the challenge is stronger because of the fact that: (1) aircrafts are usually expected to operate for longer duration of the day and night (unlike EVs which can be charged overnight), which allows for shorter time to charge; and (2) aircrafts will require battery with larger capacity which will require much longer charging time than EVs. Battery swapping could be one of the candidate solutions but it suffer from multiple challenges which prevented them to going into use commercially as mentioned earlier. These challenges include but are not limited to the difficulty in swapping and safety concerns. The weight of the battery and the amount of electrical and non-electrical connections needed with the system is a significant challenge for making battery swapping practical and safe in addition to requiring skilled personnel to do such swapping. The need for battery energy storage system with high capacity results in another challenge which is related to weight distribution in the aircraft.

When an electric aircraft lands, there are a few options for supplying its electrochemical battery with energy. The following are three options with brief description:

(1) Charge the battery such as in EVs: This solution is not suitable for electric aircrafts due to the long time needed to charge a large battery and due to the fact that such aircraft might not have the luxury of night time availability to be on the ground for charging. While aircraft charging can be done through a direct wired connection through wireless charging like in EV, both will result in long charging time and require that aircraft be grounded for long time (e.g. 10+ hours ground time versus 3-hours flight time). This is true even with fast electronic charging technology availability. It should be noted that the faster the battery is charged, the faster it ages (increased replacement cost and reduced capacity at faster rate) and the more likely for a battery cell failure to occur (increased risk/reduced safety). While this might be ok for an EV battery or consumer electronic battery, it is not for a flying aircraft.

(2) Develop batteries with electrochemistry that allow for faster charging: While there is an ongoing important and promising research on this topic, as of now such research batteries have much shorter life time (cannot be used for many charge/discharge cycles) compared to conventionally used batteries (e.g. Lithium Ion, Li-Ion, batteries). This is in addition to higher cost and lower reliability (reduced safety). In the near term to mid-term future, even with such technology, the needed charging time is likely will still be long for an aircraft, but will sure help.

(3) Battery Pack Swapping: Battery swapping did not succeed to be adapted in EV applications so far due to reasons that include but are not limited to complexity of electrical and mechanical installations of the battery pack, safety concerns, and weight. All these reasons are more problematic for an aircraft. Current efforts to realize battery swapping will not make suitable for an electric aircraft (much larger battery and higher reliability are needed).

Currently, when researchers and developers think about developing a better battery charging system, they either think about connecting a system that charging a battery using a direct connection via a power cable or through a wireless charging pad/station placed under the vehicle (or aircraft). When they think about swapping, they think about how to design the direct interconnections (wired electrical connections and complicated physical mechanical connections) between the vehicle (or aircraft) and the battery in order to make battery pack swapping realizable and easier. All of which are not practical for an electric aircraft even if one day it might be practical for an EV.

SUMMARY

This disclosure is generally related to: a Wirelessly Enabled and Distributed Energy Storage System (WEDES) and the associated controls, multi-directional wireless power transfer, architectures, packaging, and application methods and scenarios; multi-directional power transfer systems; and associated methods for exchanging wireless power modules and pricing.

An example system for distributing power across a wireless medium is described herein. The system can include a plurality of wireless modular power packs connected across a wireless medium to a wireless power receiver circuit that is connected to a load. Each wireless modular power pack can include a respective wireless power transmission circuit directing a respective wireless power signal to the wireless power receiver circuit. The system can also include a power source positioned within each of the wireless modular power packs. Each power source transmits a respective power signal across an internal power interface to a respective wireless power transmission circuit within a respective wireless modular power pack.

Additionally, each wireless modular power pack can be independently removable from the system without interrupting power transmission from other wireless modular power packs in operation and without interrupting power supply to the load.

Alternatively or additionally, each wireless modular power pack can include an enclosure housing the power source.

Alternatively or additionally, the system can include a slotted rack defining respective slots for each of the wireless modular power packs. For example, the wireless modular power packs can engage the respective slots in a wireless fit therein. Optionally, each wireless modular power pack can be equipped with a sliding mechanism to slide in a respective slot. The sliding mechanism can optionally be at least one of electrically conductive, magnetic, or inductively conductive. Optionally, the respective slot can be equipped with a sensor position detection mechanism to detect the insertion (removal) of a wireless modular power pack from the respective slot when the sliding mechanism engages (disengages) the respective slot.

Alternatively or additionally, the system can further include additional slotted racks housing additional wireless modular power packs. The additional slotted racks can be located remotely from the slotted rack.

Alternatively or additionally, the wireless modular power packs and the wireless power receiver circuit can be positioned proximate each other, and the wireless modular power packs can be positioned in respective positions to minimize interference and attenuation between the wireless modular power packs and the wireless power receiver circuit. For example, the distance between the wireless modular power packs and the wireless power receiver circuit can be so dimensioned to accommodate wireless power transmission there between. The wireless power transmission can be one of inductive resonance transmission, capacitive transmission, radiofrequency (RF) power transmission, ultrasonic transmission, or light transmission.

Alternatively or additionally, the wireless power receiving circuit can synchronize the respective wireless power signals transmitted from the wireless modular power packs and can combine the respective wireless power signals into an output power signal connected to the load. For example, the wireless power receiving circuit can synchronize the respective wireless power signals via inverter and converter circuits. Optionally, the respective wireless power transmission circuits and the wireless power receiving circuit each can include the inverter and converter circuits. The inverter and converter circuits can accomplish a DC to DC power conversion to emit a respective regulatory signal, a DC to AC inversion to transmit a respective wireless power signal, and either an AC to DC conversion or AC to AC conversion to emit the output power signal.

Alternatively or additionally, the wireless power receiving circuit can include sub-circuits configured to synchronize the respective wireless power signals in series or in parallel.

Alternatively or additionally, the respective wireless power transmission circuits and the wireless power receiving circuit further can be respective wireless power transceivers.

Alternatively or additionally, the respective wireless power transmission circuits and the wireless power receiving circuit further can include respective wireless data transceivers.

Alternatively or additionally, the system can further include a wireless power transceiver charging unit positioned proximately to the respective wireless power transmission circuits and the wireless power receiving circuit. Optionally, at least one of the wireless power transceiver charging unit, the wireless power receiving circuit, or the respective wireless power transmitting circuits can include a wired connection to an external power source. Optionally, the wireless power transceiver charging unit can include a distributed set of charging devices over which the wireless modular power packs move and charge while in motion.

Alternatively or additionally, the power source positioned within each of the wireless modular power packs can be a battery, a solar cell, a super or ultra capacitor, a hydrogen cell, a nuclear/atomic power cell, a windmill, or a fuel cell.

Alternatively or additionally, the system can further include an external power source. The external power source can be at least one of a transmission circuit, a battery, a fuel cell, a photovoltaic solar cell, hydrogen cells, nuclear/atomic power cells, solar cells, windmills, and super-capacitors.

Another system for distributing power across a wireless medium is described herein. The system can include a plurality of wireless modular power packs connected across the wireless medium to a wireless power receiver circuit that is connected to a load. Each wireless modular power pack can include a respective wireless power transmission circuit directing a respective wireless power signal to the wireless power receiver circuit. The system can also include a power source positioned within each of the wireless modular power packs. The power source can transmit a respective power signal across an internal power interface to a respective wireless power transmission circuit within a respective wireless modular power pack. Additionally, the system can include a short range communication unit positioned within each of the wireless modular power packs. The short range communication unit can be configured to transmit one or more operating parameters of the power source over a low-power wireless data link. Further, the system can include a control unit in electronic communication with the wireless modular power packs over the low-power wireless data link. The control unit can include a processor and a memory in operable communication with the processor, the memory having computer-executable instructions stored thereon that, when executed by the processor, cause the processor to receive the one or more operating parameters and store in the memory the one or more operating parameters.

Additionally, the one or more operating parameters of the power source can be voltage, current, DC to DC output voltage, temperature, or impedance.

Alternatively or additionally, the memory can have further computer-executable instructions stored thereon that, when executed by the processor, cause the processor to calculate a power/energy management parameter using the one or more operating parameters of the power source. For example, the power/energy management parameter be a state of charge (SOC) condition, a state of health (SOH) condition, or a capacity of the power source.

Alternatively or additionally, the memory can have further computer-executable instructions stored thereon that, when executed by the processor, cause the processor to select a power distribution allocation from the wireless modular power packs depending upon a respective condition of each of the wireless modular power packs. For example, the power distribution allocation selection can be made by determining discharge and charge rates, determining scaling factors for power usage, and/or selectively disabling one or more of the wireless modular power packs. Alternatively or additionally, the power distribution allocation selection can be made by setting a respective DC to DC reference voltage, current, power, or energy for each of the wireless modular power packs.

Alternatively or additionally, the memory can have further computer-executable instructions stored thereon that, when executed by the processor, cause the processor to receive and store a unique identifier associated with at least one of the wireless modular power packs.

Alternatively or additionally, the system can include a long range communication unit in electronic communication with a remote server over a wireless data link. Optionally, the memory can have further computer-executable instructions stored thereon that, when executed by the processor, cause the processor to transmit, via the long range communication unit, the one or more operating parameters of the power source to the remote server. Alternatively or additionally, the memory can have further computer-executable instructions stored thereon that, when executed by the processor, cause the processor to receive from the remote server, via the long range communication unit, information concerning at least one of the wireless modular power packs. Optionally, the information can be a power/energy management parameter (e.g., a state of charge (SOC) condition, a state of health (SOH) condition, or a capacity), a fault detection condition, or energy pricing information. Optionally, the memory can have further computer-executable instructions stored thereon that, when executed by the processor, cause the processor to retrieve the information using a unique identifier associated with at least one of the wireless modular power packs.

Alternatively or additionally, the wireless power receiving circuit can synchronize the respective wireless power signals transmitted from the wireless modular power packs and can combine the respective wireless power signals into an output power signal connected to the load.

Alternatively or additionally, the system can be implemented in a vehicle (e.g., automobile, vessel, aircraft, etc.). The in-vehicle system can further include an electronic interface in communication with a vehicle power control unit configured to coordinate vehicle power consumption from the system and from an outside power source. The outside power source can be a fossil fuel source, a solar source, a wired power source, or a wind driven power source.

Alternatively or additionally, the power source can optionally be a battery. The system can further include a wireless power transceiver charging unit positioned proximately to the respective wireless power transmission circuits and the wireless power receiving circuit. Optionally, the wireless power transceiver charging unit can be connected to a renewable energy source.

Alternatively or additionally, the respective wireless power transmission circuits and the wireless power receiving circuit can be respective wireless power transceivers.

Alternatively or additionally, the memory can store a state of health (SOH) condition for the wireless modular power packs. The state of health condition can be determined by preset parameters stored in the memory. Optionally, the preset parameters can be, for each of the wireless modular battery packs, at least one of an internal resistance, capacitance, voltage, number of charge cycles, or number of discharge cycles.

Alternatively or additionally, the processor can be in electronic communication with a multi-directional controller and the controller is in electronic communication with the wireless modular power packs and the wireless power receiver circuit.

Alternatively or additionally, transmission and receipt of multi-directional power and multi-directional data can extend in any direction between the wireless modular power packs, a slot host, a charging pad, a charging station, another vehicle, another data system, or another power system.

Alternatively or additionally, the power source positioned within each of the wireless modular power packs can be a battery, a solar cell, a super or ultra capacitor, a hydrogen cell, a nuclear/atomic power cell, a windmill, or a fuel cell.

An example wireless distribution power system is also described herein. The system can include a plurality of wireless battery modules connected across a wireless medium to a load transceiver. Each wireless battery module can include a source transceiver directing a respective wireless power signal to the load transceiver. The system can include respective batteries positioned within each of the wireless battery modules. The batteries can transmit respective power signals across an internal power interface to a respective source transceiver. The system can also include a processor in electronic communication with the wireless battery modules, the processor further connected to a non-volatile computer readable memory comprising software instructions executable by the processor. Additionally, the system can include respective wireless data transceivers connected to the respective source transceivers and the load transceiver. The respective wireless data transceivers can be further connected to the processor. Further, the system can include a wireless power transceiver charging unit positioned proximately to at least one of the wireless battery modules in a position such that the wireless power transceiver charging unit transfers power to the at least one of the wireless modular power packs.

Optionally, the wireless power transceiver charging unit can be positioned proximately to the load transceiver in a position such that the wireless power transceiver charging unit transfers power to the load transceiver.

Alternatively or additionally, a global positioning system (GPS) chip (or other location determination mechanism) can be connected to at least one of the wireless battery modules or the load transceiver.

Alternatively or additionally, the respective wireless data transceivers can be in electronic communication with at least one of a cellular network, a wireless network, or a satellite communications component.

Alternatively or additionally, the non-volatile computer readable memory can store a state of charge balancing module and a state of health module. The modules can include software instructions executable by the processor to select a power distribution allocation from the wireless battery modules depending upon a respective state of charge condition or a state of health condition of each of the wireless battery modules.

Alternatively or additionally, the system can be implemented in a vehicle (e.g., automobile, vessel, aircraft, etc.). The wireless medium can span a space between the vehicle and at least one other vehicle. Optionally, the respective wireless data transceivers can be positioned within the vehicle such that the processor uploads new data and outputs new instructions to at least one associated computer. For example, the at least one associated computer can be a second processor implementing a charging and pricing software module. The at least one associated processor can be located within the vehicle or remotely (e.g., a remote computer). The charging and pricing software module can receive data from the respective source transceivers and the load transceiver via the respective wireless data transceivers and can output pricing factors for allocating power output from or input to at least one of the wireless battery modules.

An adaptive wireless distribution power system is also described herein. The system can include a plurality of wireless power modules connected across a wireless medium to a wireless power load transceiver. Each wireless power module can include a respective wireless power source transceiver directing a respective wireless power signal to the wireless power load transceiver. The system can include respective power sources positioned within each of the wireless power modules. The power sources can transmit respective wireless power signals across an internal power interface to a respective wireless power source transceiver. The system can also include at least one processor in electronic communication with each of the wireless power modules and the wireless power load transceiver, the processor further connected to a non-volatile computer readable memory comprising software instructions executable by the processor. Additionally, the system can include respective wireless data transceivers connected to the respective wireless power source transceivers and the wireless power load transceiver. The respective wireless data transceivers can be further connected to the processor. The software instructions can include an adaptive control system directing input power signals, output power signals, input data signals, and output data signals throughout the system, and, on a simultaneous basis, the adaptive control system can allocate a respective power output from each of the respective wireless power source transceivers and the wireless power load transceiver. The respective power outputs can be determined on the basis of system balancing parameters.

Optionally, the system balancing parameters can be at least one of power source state of health data, power source state of charge data, or system load data.

Alternatively or additionally, the wireless power load transceiver can be a second processor receiving at least one of the input data signals to adapt at least one of the output power signals to a condition by which one of the wireless power modules has been removed from the system.

Alternatively or additionally, the respective power sources can be batteries. The system can further include a wireless power charging unit positioned sufficiently proximate the wireless power modules and the wireless power load transceiver to wirelessly couple, across the medium, a wireless recharging power signal to the wireless power modules and the wireless power load transceiver. Optionally, the adaptive control system can direct which system component is recharged by the wireless power modules.

Alternatively or additionally, the wireless power modules and the wireless power load transceiver can be directly connected to a slot host system. The slot host system can include a material that is electrically conductive, inductively conductive, or magnetic, such that the slot host system is a conduit to receive a charge from one of the input power signals and disperse a charge in the form of one of the output power signals. Optionally, the slot host system can include energy guide formations directing wireless power signals to one or more loads as determined by the adaptive control system. The energy guide formations can be configured to be aligned across disparate slot host systems to transfer wireless power.

Alternatively or additionally, the processor can be connected to electronic configuration circuits and the memory can store configuration algorithms to enable maximum power transfer from the respective wireless power source transceivers, maximizing received power at the wireless power load transceiver, or maximizing efficiency in the power transfer and the received power.

Alternatively or additionally, the respective power sources positioned within each of the wireless power modules can be batteries, solar cells, super or ultra capacitors, hydrogen cells, nuclear/atomic power cells, windmills, or fuel cells.

Alternatively or additionally, the respective power sources positioned within each of the wireless modular power packs can be solar cells, and the electronic configuration circuits and configuration algorithms can be used to perform maximum power point tracking.

An example data sharing and/or analysis method is described herein. The method can include receiving, at a remote server, data comprising one or more respective operating parameters and respective unique identifiers for a plurality of wireless power modules, wherein the data is received over a wireless data link. The method can also include storing, in memory at the remote server, the one or more respective operating parameters, and calculating respective power/energy management parameters for the wireless power modules using the one or more respective operating parameters. The method can further include receiving, at the remote server, a request from a user over the wireless data link, and in response to the request, calculating charging and pricing factors for at least one of the wireless power modules. Additionally, the method can include providing, over the wireless data link, the charging and pricing factors for the at least one of the wireless power modules to the user.

Optionally the one or more respective operating parameters can be voltage, current, DC to DC output voltage, state of charge (SOC) condition, temperature, impedance, or capacity of a power source.

Alternatively or additionally, the respective power/energy management parameters can be a state of charge (SOC) condition, a state of health (SOH) condition, or a capacity of a power source.

Alternatively or additionally, the charging and pricing factors can be an energy unit price, a user account debit amount, or a user account credit amount.

Alternatively or additionally, the charging and pricing factors can be calculated using a state of charge (SOC) of the at least one of the wireless power modules.

Alternatively or additionally, the charging and pricing factors can be calculated based on a difference between the SOC and an amount of power transferred to the at least one of the wireless power modules. For example, the charging and pricing factors can be calculated based on a difference between the SOC of the at least one of the wireless battery modules and a SOC of a new wireless power module.

Optionally, the charging and pricing factors can be further calculated based on a state of health (SOH) of the at least one of the wireless power modules.

Alternatively or additionally, the method can further include receiving, at the remote server, location data associated with the at least one of the wireless power modules. Optionally, the charging and pricing factors can be calculated using the location data associated with the at least one of the wireless power modules. Alternatively or additionally, the method can further include providing information to the user about a location for re-charging the at least one of the wireless power modules.

Alternatively or additionally, the method can further include providing a user interface for displaying at least one of the one or more respective operating parameters, the respective power/energy management parameters, or the charging and pricing factors.

Alternatively or additionally, the method can further include receiving, at the remote server, respective unique identifiers for each the wireless power modules.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 1A illustrates a perspective view of the wireless module power packs and slotted rack according to aspects described herein. FIG. 1B is a block diagram illustrating the WEDES system. FIG. 1C is a schematic diagram illustrating the WEDES system.

In FIG. 15, wireless power transmission is accomplished by coupling (e.g., using coils).

FIG. 18 illustrates WEDES system components related to internal architecture including wireless power transfer, short-range communication, long-range communication, and power conversion and regulation. In FIG. 18, wireless power transmission is accomplished by inductive, capacitive, radiative, light, or ultrasonic coupling.

FIG. 19 also illustrates WEDES system components related to internal architecture including wireless power transfer, short-range communication, long-range communication, and power conversion and regulation. In FIG. 19, a plurality of on-board modules are used with a plurality of wireless modular power packs. In FIG. 19, multi-directional power and data transmission are shown.

In FIG. 22, a plurality of wireless modular power packs are used with a plurality of on-board modules powering multiple loads, where each uses the example DC-DC, AC-AC, and DC-AC implementations of FIGS. 20 and 21.

In FIG. 23, a plurality of wireless modular power packs are used with a plurality of on-board modules that are connected in series, where each use the example DC-DC, AC-AC, and DC-AC implementations of FIGS. 20 and 21.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. The term "vehicle" as used in this disclosure includes any kind of machine used for transporting humans or inanimate objects from one point to another, and includes without limitation, such machines as ground vehicles, cars, trucks, aircrafts, airplanes, trains, ships, boats, recreational devices, and other mobile devices. Other use cases for this disclosure include homes and buildings. A normal consumer automobile, a house for human dwelling, and an aircraft, all using wireless power sources for at least part of their respective power systems, will be used as examples to explain the embodiments disclosed herein. Moreover, while many examples describe that the mobile energy source is from electrochemical battery cells, the claims also apply when any other source is used in conjunction with or to replace the battery cells, such as fuel cells, hydrogen cells, nuclear or atomic power cells, solar cells, windmills, and supercapacitors, among others.

Figure 1A:
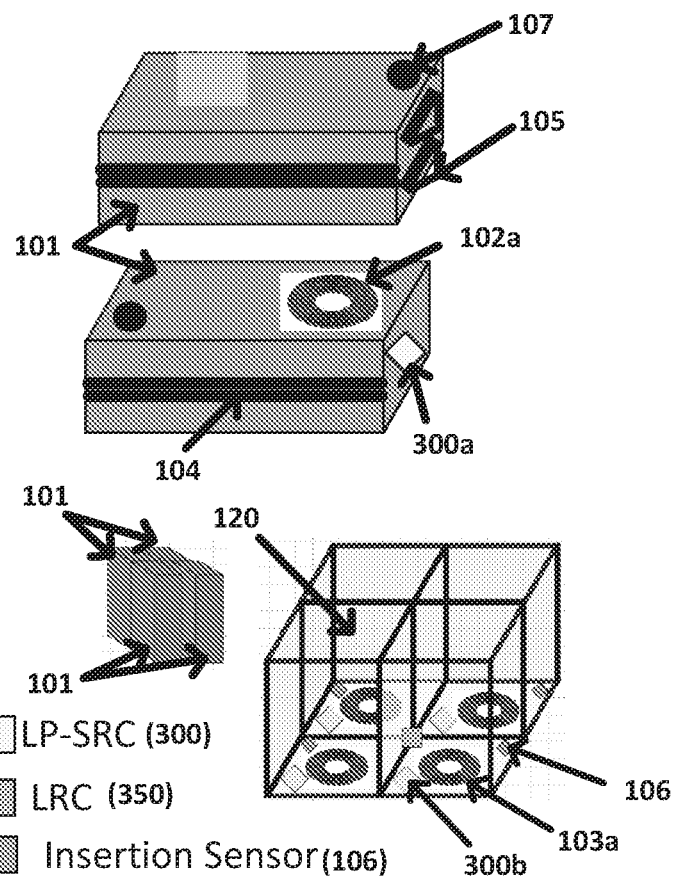
FIGS. 1A-1C illustrate an example Wirelessly Enabled and Distributed Energy Storage (WEDES) system according to implementations described herein.
Figure 1B:
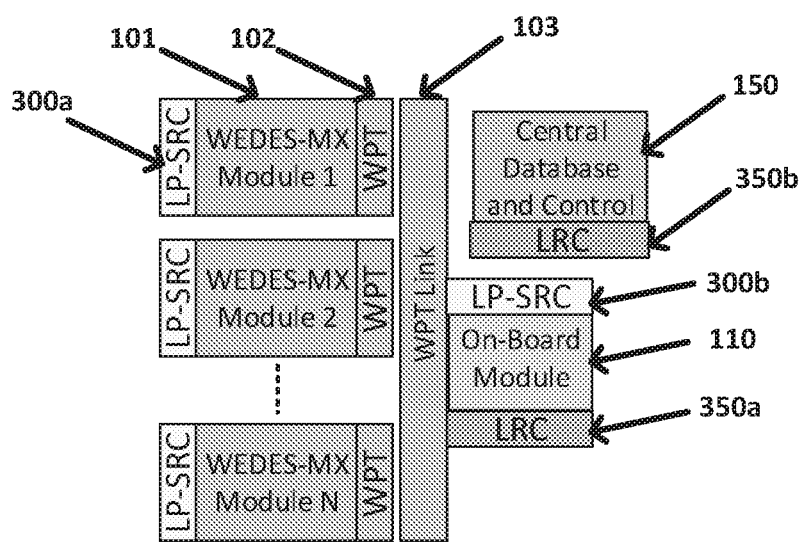
Figure 1C:
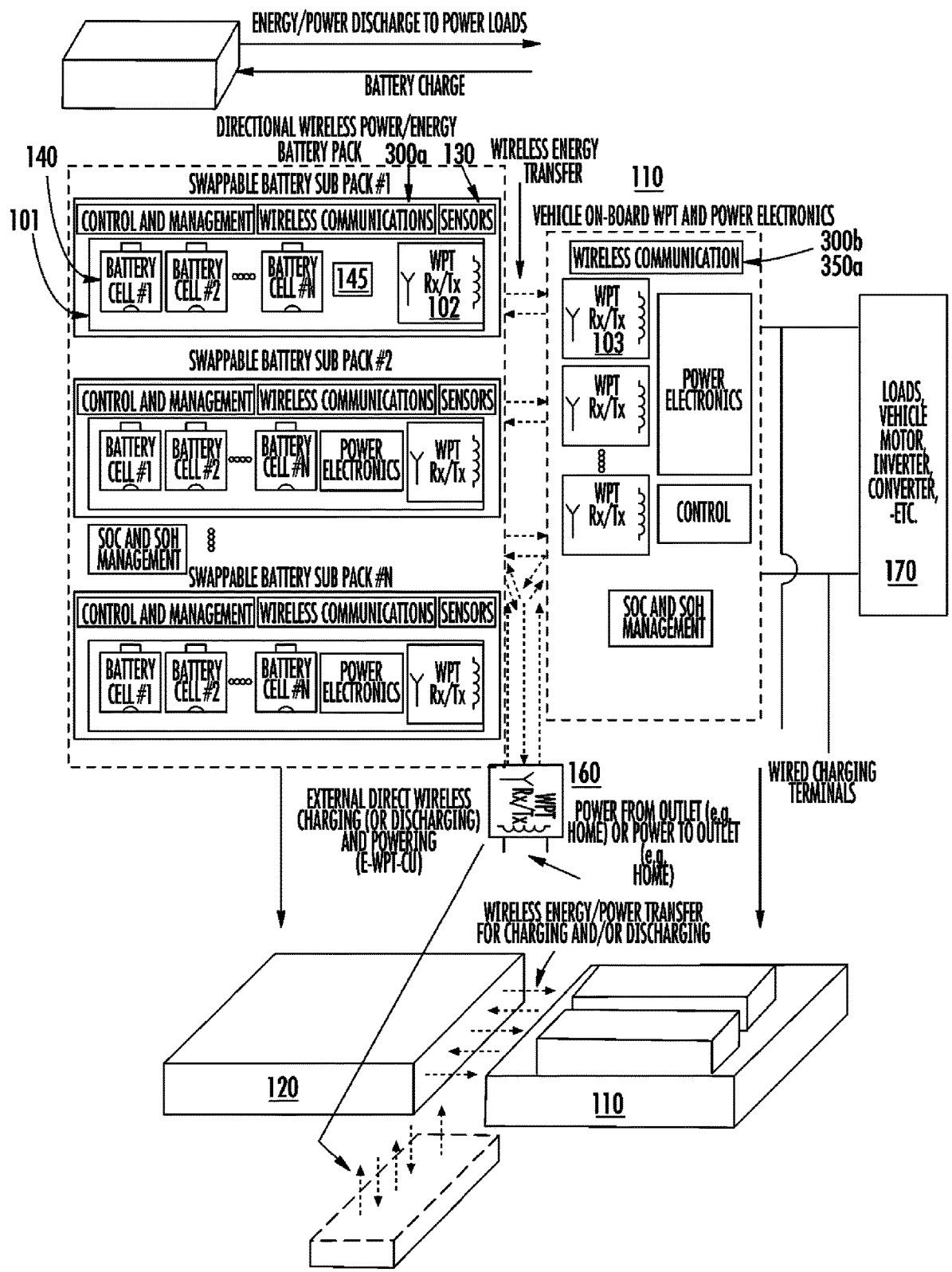

Referring now to FIGS. 1A-1C, an example Wirelessly Enabled and Distributed Energy Storage (WEDES) system is described. This disclosure contemplates that the WEDES system can be used for wireless power distribution. Examples of wireless power distribution using the WEDES system are described herein. The system can include one or more wireless module power packs 101. The wireless module power packs are also sometimes referred to herein as "wireless power modules" or "WEDES-MX module" or "modules." In addition, when the modular power packs include a battery/batteries, the modular power packs are sometimes referred to herein as "wireless battery packs" or "wireless battery modules." This disclosure contemplates that the system can include a plurality of wireless module power packs 101. For example, in FIG. 1A, the system includes four (4) wireless module power packs 101. In FIGS. 1B and 1C, the system includes "N" wireless module power packs 101. It should be understood that the system can include any number (e.g., one (1) or more) wireless module power packs 101, and that the number of wireless module power packs 101 shown in the figures are provided only as examples.

A wireless module power pack 101 can include a power source (e.g., a battery 140 as shown in FIG. 1C or other power source). In some implementations, the wireless module power pack 101 can include a plurality of power sources (e.g., a plurality of batteries 140 as shown in FIG. 1C or other power sources). The power source(s) can optionally be positioned within the wireless module power pack 101 (e.g., within an enclosure). Each wireless module power pack 101 can be integrated inside an enclosure such that it has no wired connections to the outside of the enclosure. The power transfer from and to each wireless module power pack 101 can be accomplished wirelessly. Additionally, data transfer from and to each wireless module power pack 101 can also be accomplished wirelessly. The power source(s) can include, but are not limited to, a battery, a solar cell, a super or ultra capacitor, a hydrogen cell, a nuclear/atomic power cell, a windmill, or a fuel cell. Additionally, each of the wireless module power packs 101 can include a respective wireless power transmission circuit 102. The respective wireless power transmission circuits 102 can optionally be positioned within the wireless module power packs 101 (e.g., within the enclosure). The wireless power transmission circuit 102 is also sometimes referred to herein as a "source transceiver," e.g., capable of both transmitting and receiving power wirelessly. This disclosure contemplates wireless transmission of power over the wireless medium by inductive resonance transmission, capacitive transmission, radiofrequency (RF) power transmission, ultrasonic transmission, or light transmission. Accordingly, the power source(s) can transmit a respective power signal across an internal power interface 145 (e.g., including power electronics) to a respective wireless power transmission circuit 102, which can then transmit the power wirelessly over the wireless medium. In some implementations, the wireless power transmission circuit is a transmission coil 102a (e.g., configured to RF power transmission) configured to transmit power to a receiver coil 103a as shown in FIG. 1A. The wireless power transmission circuit 102 can be configured to direct a respective wireless power signal to a wireless power receiver circuit 103, which is connected a load 170. The wireless power receiver circuit 103 is also sometimes referred to herein as a "load transceiver," e.g., capable of both transmitting and receiving power wirelessly.

In some implementations, the wireless power receiver circuit 103 can be part of an on-board module 110 as shown in FIG. 1B. The on-board module is sometimes referred to herein as "OB module." The on-board module 110 can optionally be implemented in a vehicle (e.g., automobile, vessel, aircraft, etc.) or a building (e.g., a home, office, etc.). In these implementations, the wireless module power packs 101 can be used to power a load situated in the vehicle or the building. Alternatively or additionally, the wireless module power packs 101 can be configured to exchange power wireless with an external power source 160 (i.e., external to the wireless module power packs 101) including, but not limited to, a transmission circuit, a battery, a fuel cell, a photovoltaic solar cell, hydrogen cells, nuclear/atomic power cells, solar cells, windmills, and supercapacitors. The external power source 160 can optionally be part of, or accessed via, the vehicle or the building. Additionally, the external power source 160 can be configured for wireless power transmission as shown in FIG. 1C.

In some implementations, the system can include a slotted rack 120 defining respective slots for each of the wireless modular power packs 101. An example slotted rack 120 is shown in FIG. 1A, where there are four (4) respective slots to receive four (4) wireless modular power packs 101. The wireless modular power pack 101 can engage a respective slot in a wireless fit therein. Optionally, each wireless modular power pack 101 can be equipped with a sliding mechanism 104, as shown in FIG. 1A, to slide in a respective slot of the slotted rack 120. The sliding mechanism 104 can optionally be at least one of electrically conductive, magnetic, or inductively conductive. In some implementations, each wireless modular power pack 101 can include a handle 105, as shown in FIG. 1A, to facilitate insertion (removal) of the wireless modular power pack 101 from the slotted rack 120. In some implementations, the respective slot can be equipped with a sensor position detection mechanism 106 to detect the insertion (removal) of the wireless modular power pack 101 from the respective slot when the sliding mechanism 104 engages (disengages) the respective slot of the slotted rack 120. Optionally, each wireless modular power pack 101 can include a position/orientation indicator 107, as shown in FIG. 1A, to facilitate placement of the wireless module power pack 101 in the slotted rack 120. In some implementations, the slotted rack 120 can be part of an on-board module 110, which can optionally be implemented in a vehicle or building.

Figure 2:
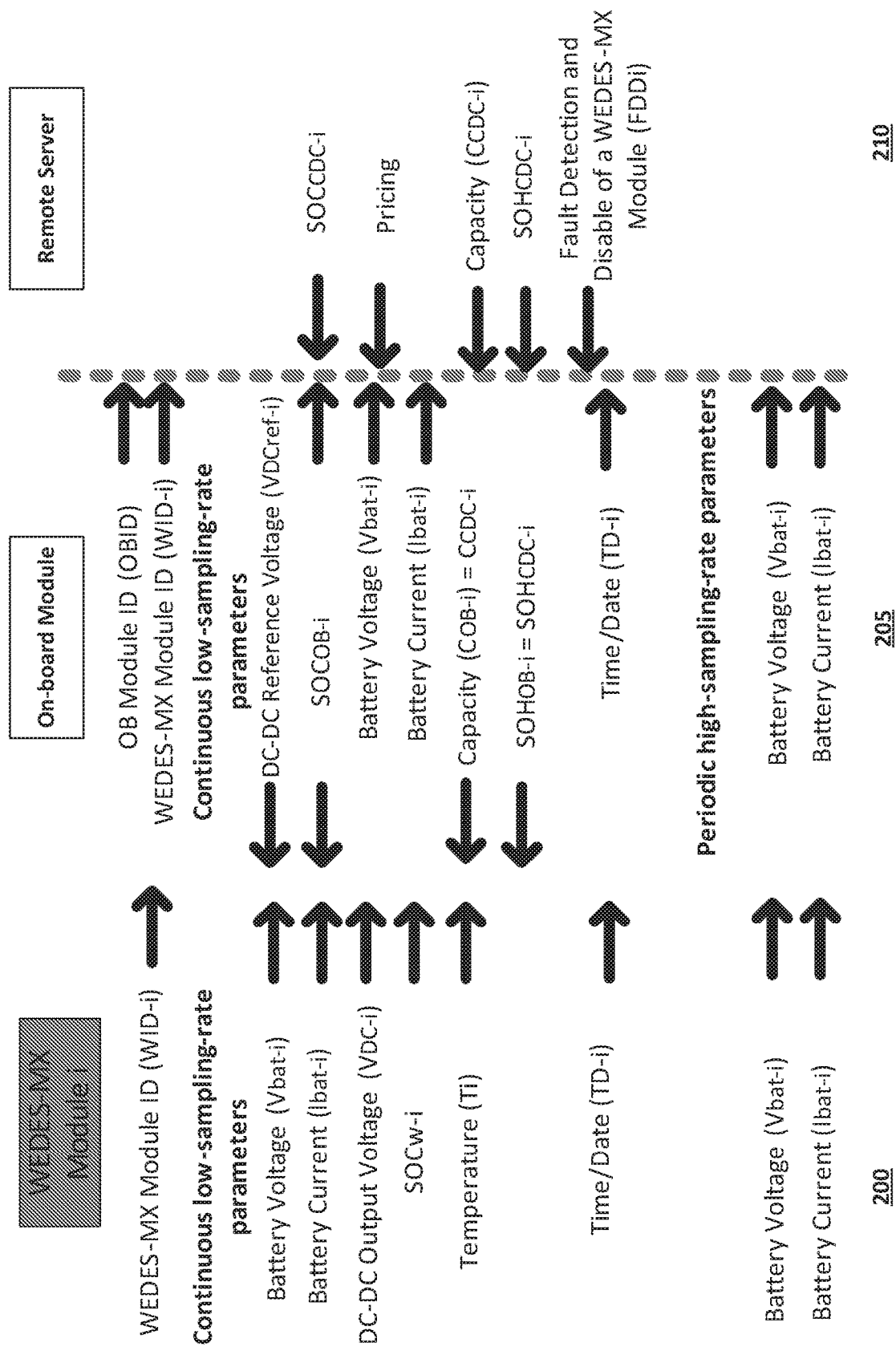
FIG. 2 is a diagram illustrating various operating parameters and power/energy management parameters, as well as data flow, in a WEDES system.

The system can also include one or more wireless data transceivers (e.g., short and/or long range communication units). Each of the wireless modular power packs 101 can include a short range communication (SRC) unit 300a. The SRC 300a can optionally be positioned within the wireless module power pack 101 (e.g., within the enclosure). Additionally, the on-board module 110 can include a SRC unit 300b. SRCs 300a and 300b are sometimes referred to individually or collectively herein as "SRC 300." The SRC 300a can be configured to transmit one or more operating parameters of the power source(s) over a low-power wireless data link to the SRC 300b. This disclosure contemplates that the low-power wireless data link can be any wireless data link that facilitates data exchange between the SRC 300. For example, in some implementations, the low-power wireless data link is implemented using for examples BLUETOOTH, ZIGBEE, near field communication (NFC), or any other point-to-point or multi-point-to-multi-point communication protocols. The system can include one or more sensors 130 for measuring the operating parameters. Operating parameters include, but are not limited to, voltage, current, DC to DC output voltage, temperature, or impedance of the wireless modular power pack 101. Example operating parameters are shown in FIG. 2. For example, various operating parameters of the wireless module power pack 101 are highlighted by reference character 200 in FIG. 2. The arrows in FIG. 2 illustrate the direction of data flow between the wireless module power pack 101, the on-board module 110, and a remote server 150. The remote server 150 is sometimes referred to herein as a "Central Database and Control (CDC) unit."

Figure 4:
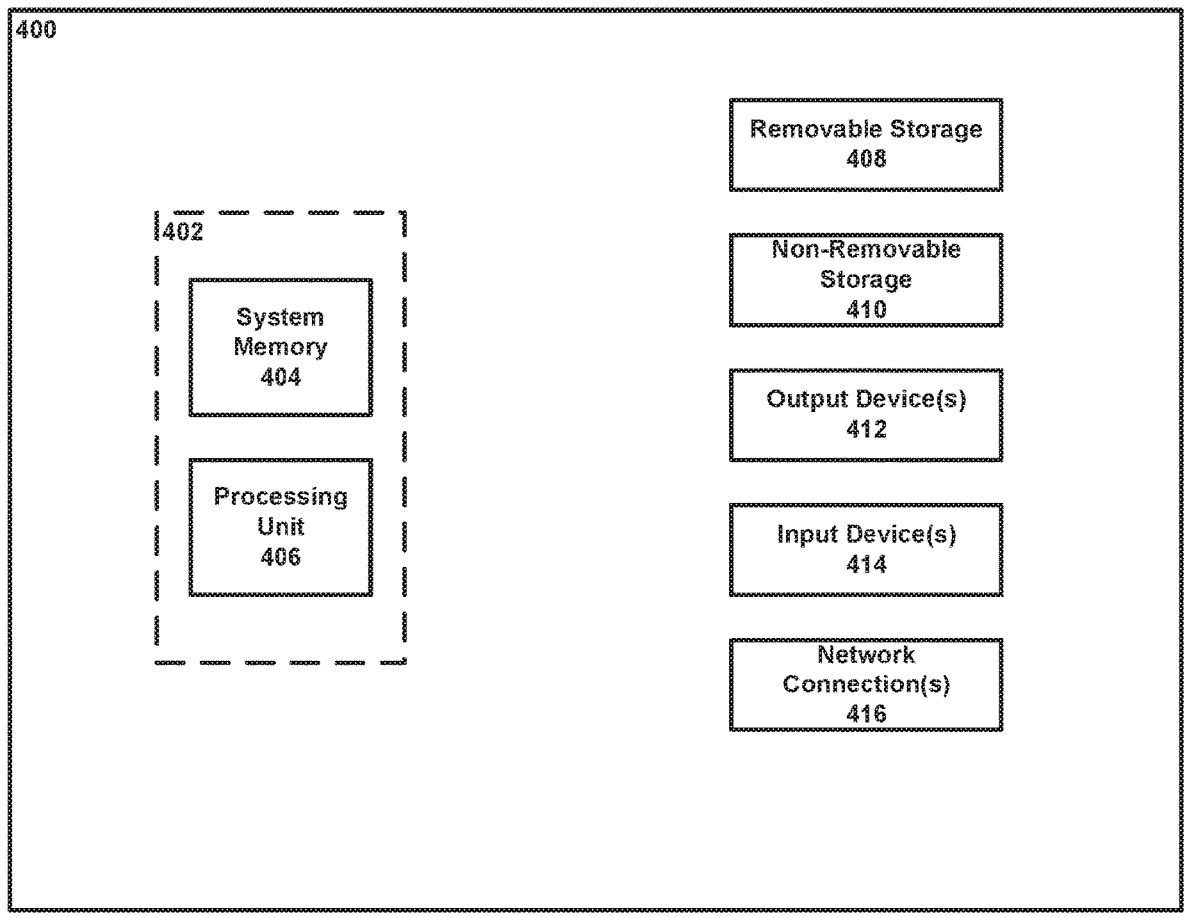
FIG. 4 is an example computing device.

The system can also include a control unit 135 (e.g., at least processor and memory of computing device 400 as shown in FIG. 4). The control unit 135 can optionally be included within the on-board module 110. The control unit 135 can be operably connected to (e.g., in electronic communication with) the wireless module power packs 101. This disclosure contemplates that the wireless module power packs 101 can be operably connected to the control unit of the on-board module 110 through any communication link that facilitates data exchange including, but not limited to, wired, wireless, and optical links. For example, in some implementations, the SRCs 300 located in the wireless module power packs 101 and on-board module 110, respectively, can be operably connected through the low-power wireless data link (e.g., using BLUETOOH or ZIGBEE protocols). In this way, the wireless module power packs 101 and on-board module 110 can exchange data (e.g., operating parameters and/or power/energy management parameters). The control unit 135 can be configured to receive, and store in memory, data. For example, in some implementations, the control unit 135 can be configured to receive and store one or more operating parameters of the wireless modular power packs 101. This disclosure contemplates that each of the wireless modular power packs 101 can be associated with a unique identifier. This allows the control unit 135 to store module-specific data in an organized fashion (e.g., in a database).

Figure 3:
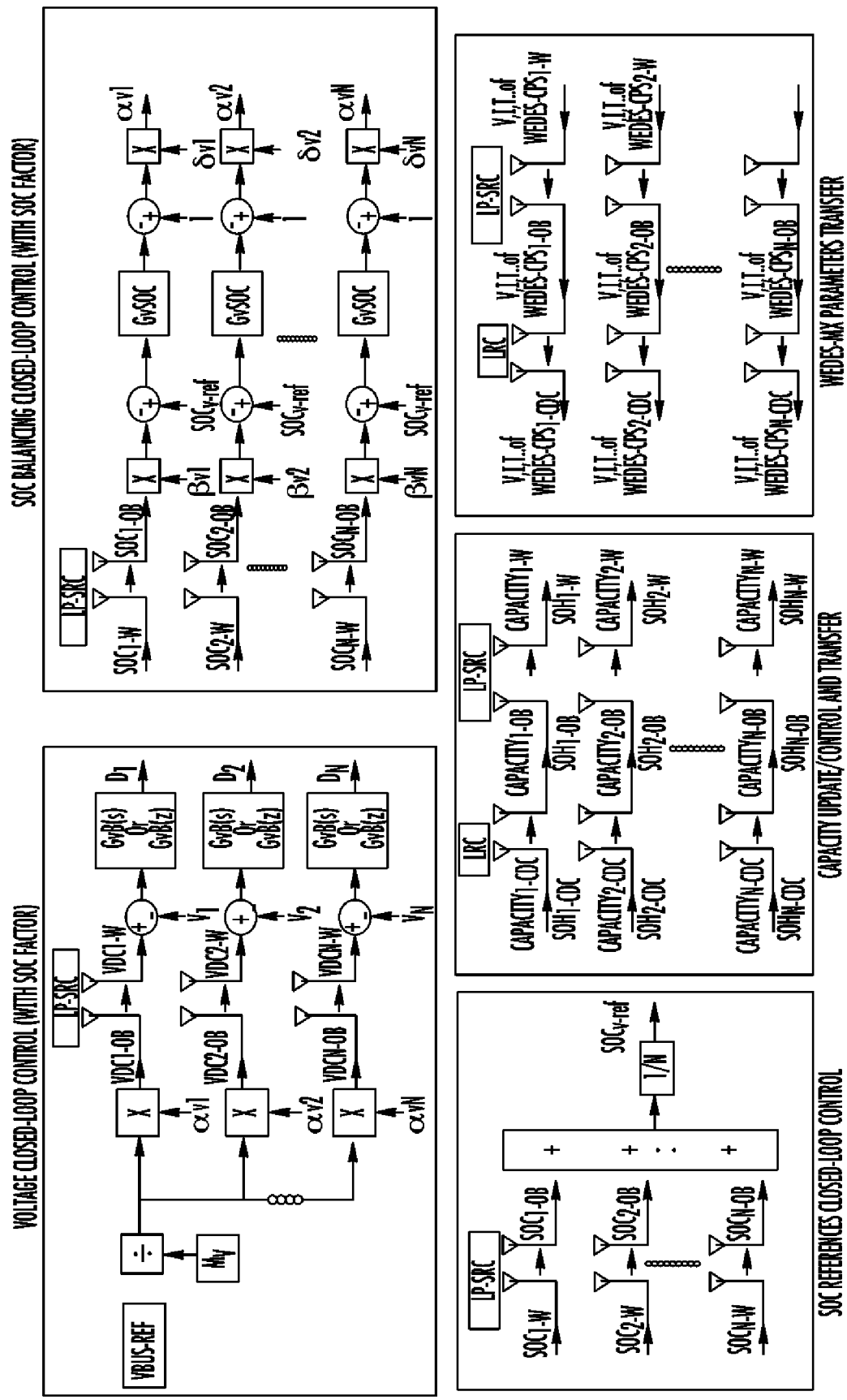
FIG. 3 illustrates example control algorithm flow diagrams to be used in a WEDES system based on the energy sharing principle with wireless communications and control.

In some implementations, the control unit 135 can be further configured to calculate a power/energy management parameter using the one or more operating parameters. Power/energy management parameters include, but are not limited to, a state of charge (SOC) condition, a state of health (SOH) condition, or a capacity. This disclosure contemplates using any known technique or algorithm to calculate the power/energy management parameters including, but not limited to, the algorithms shown in FIG. 3. Example operating parameters and/or power/energy management parameters are shown in FIG. 2. For example, various operating parameters and/or power/energy management parameters handled by the on-board module 110 are highlighted by reference character 205 in FIG. 2. The arrows in FIG. 2 illustrate the direction of data flow between the wireless module power pack 101, the on-board module 110, and the remote server 150. Additionally, in some implementations, the control unit 135 can be further configured to transmit control commands configured to control one or more of the wireless modular power packs 101. Example control techniques are shown in FIG. 3. Optionally, the control unit 135 can control the wireless modular power packs 101 by analyzing the operating parameters and/or power/energy management parameters. For example, in some implementations, the control unit 135 can be configured to select a power distribution allocation from the wireless modular power packs 101, for example, depending on a respective condition (e.g., operating parameter and/or power/energy management parameter) of a respective wireless modular power pack 101.

Alternatively or additionally, the system can include a long range communication (LRC) unit 350a. The LRC 350a can optionally be positioned within the on-board module 110. Additionally, a remote server 150 (e.g., at least processor and memory of computing device 400 as shown in FIG. 4) can include an LRC unit 350b. LRCs 350a and 350b are sometimes referred to individually or collectively herein as "LRC 350." The LRC 350a can be configured to exchange data with LRC 350b over a wireless data link. This disclosure contemplates that the wireless data link can be any wireless data link that facilitates data exchange including, but not limited to, a cellular network (e.g., 3G or 4G network), a wireless network (e.g., WiFi or WiMax network), or a satellite communications network. The on-board module 110 and remote server 150 can exchange data such as the operating parameters and/or power/energy management parameters described above. Additionally, this disclosure contemplates that each of the wireless modular power packs 101 can be associated with a unique identifier, which allows the remote server 150 to store module-specific data in an organized fashion (e.g., in a database). Similar to the control unit 135, the remove server 150 can also be configured to calculate a power/energy management parameter using the one or more operating parameters. This disclosure contemplates that the remote server 150 can be configured to store more data, e.g., a more robust historical record of the operating parameters and/or power/energy management parameters associated with the wireless modular power packs 101. In some implementations, the remote server 150 has greater processing capability as compared to the on-board module 110. Accordingly, this disclosure contemplates that the remote server 150 can calculate power/energy management parameters with greater accuracy. The remote server 150 can be configured to communicate (e.g., update)

the on-board module 110 regarding the same. Example operating parameters and/or power/energy management parameters are shown in FIG. 2. For example, various operating parameters and/or power/energy management parameters handled by the remote server 150 are highlighted by reference character 210 in FIG. 2. The arrows in FIG. 2 illustrate the direction of data flow between the wireless module power pack 101, the on-board module 110, and the remote server 150. Additionally, the remote server 150 and on-board module 110 can exchange and/or store module-specific data using the respective unique identifiers associated with the wireless modular power packs 101. Further, in some implementations, the remote server 150 can also be further configured to transmit control commands configured to control one or more of the wireless modular power packs 101 (e.g., by communicating control commands via the control unit of the on-board module 110). Optionally, the remote server 150 can be configured to analyze the operating parameters and/or power/energy management parameters and issue appropriate control commands. Example control techniques are shown in FIG. 3.

Example Computing Device

It should be appreciated that the logical operations described herein with respect to the various figures may be implemented (1) as a sequence of computer implemented acts or program modules (i.e., software) running on a computing device (e.g., the computing device described in FIG. 4), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Referring to FIG. 4, an example computing device 400 upon which embodiments of the invention may be implemented is illustrated. It should be understood that the example computing device 400 is only one example of a suitable computing environment upon which embodiments of the invention may be implemented. Optionally, the computing device 400 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 400 typically includes at least one processing unit 406 and system memory 404. Depending on the exact configuration and type of computing device, system memory 404 may be volatile (such as random access memory (RAM)), non-volatile (such as read-only memory (ROM), flash memory, etc.), or some combination of the two. This most basic configuration is illustrated in FIG. 4 by dashed line 402. The processing unit 406 may be a standard programmable processor that performs arithmetic and logic operations necessary for operation of the computing device 400. The computing device 400 may also include a bus or other communication mechanism for communicating information among various components of the computing device 400.

Computing device 400 may have additional features/functionality. For example, computing device 400 may include additional storage such as removable storage 408 and non-removable storage 410 including, but not limited to, magnetic or optical disks or tapes. Computing device 400 may also contain network connection(s) 416 that allow the device to communicate with other devices. Computing device 400 may also have input device(s) 414 such as a keyboard, mouse, touch screen, etc. Output device(s) 412 such as a display, speakers, printer, etc. may also be included. The additional devices may be connected to the bus in order to facilitate communication of data among the components of the computing device 400. All these devices are well known in the art and need not be discussed at length here.

The processing unit 406 may be configured to execute program code encoded in tangible, computer-readable media. Tangible, computer-readable media refers to any media that is capable of providing data that causes the computing device 400 (i.e., a machine) to operate in a particular fashion. Various computer-readable media may be utilized to provide instructions to the processing unit 406 for execution. Example tangible, computer-readable media may include, but is not limited to, volatile media, non-volatile media, removable media and non-removable media implemented in any method or technology for storage of information such as computer readable instructions, data structures, program modules or other data. System memory 404, removable storage 408, and non-removable storage 410 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 406 may execute program code stored in the system memory 404. For example, the bus may carry data to the system memory 404, from which the processing unit 406 receives and executes instructions. The data received by the system memory 404 may optionally be stored on the removable storage 408 or the non-removable storage 410 before or after execution by the processing unit 406.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

EXAMPLES

As described herein, the power transfer system for each module (e.g., wireless module power pack 101 in FIGS. 1A-1C) in the WEDES system has its own independent subsystem to transfer power (as well as transfer data) to an on-board portion (e.g., on-board module 110 in FIGS. 1A-1C) of the WEDES system, independently from the other modules. The subsystems directing wireless power from each of the modules in a slotted rack (e.g., slotted rack 120 in FIGS. 1A and 1C), which can be embedded as a part of a vehicle in different locations, ultimately combine, at a corresponding a power receiver circuit (e.g., wireless power receiver circuit 103 in FIGS. 1A-1C), the received power of all modules (by using power electronics, in series and/or in parallel) in order to provide power to a load (e.g., load 170 in FIG. 1C) such as a vehicle, building, or other machine. Removing or disabling a module or a module failure will not completely interrupt the power supply to the load, which is taken care of by reconfiguring the controller operation and the associated electronic circuits, leading to greater reliability and safety because the other modules in the WEDES system are still capable of supplying power to the load.

As described above, the WEDES system can include a bi-directional communications system (e.g., enabled using SRCs 300 and/or LRCs 350 in FIGS. 1A-1C), with communications circuits installed for use with a wireless power transmission circuit (e.g., wireless power transmission circuit 102 in FIGS. 1A-1C), a wireless power receiver circuit (e.g., wireless power receiver circuit 103 in FIGS. 1A-1C), and at least one wireless power charging unit (e.g., external power source 160 in FIG. 1C). The bi-directional communications system allows for data transfer, via wireless data transceivers (e.g., SRCs 300 and/or LRCs 350 in FIGS. 1A-1C), between the above noted components of the system. The communications system is in electronic communication with respective power electronics operating in either the wireless power transmission circuit, the wireless power receiving circuit, or the wireless power charging unit. In one example implementation, an algorithm stored in a memory associated with a control unit (e.g., control unit 135 in FIG. 1C), State-Of-Charge (SOC) and State-Of-Health (SOH) balancing control can be used to balance SOC and SOH between the modules (e.g., wireless module power packs 101 in FIGS. 1A-1C) of the WEDES system. If a module is inserted which has higher (or lower) SOC or SOH compared to the other modules in the WEDES system, an energy sharing SOC and SOH control scheme can draw higher energy from the module with higher SOC or SOH value, for example. Optionally, the desired SOC or SOH percentage between modules can be specified (e.g., manually by a user such as an operator or technician/engineer) through a user interface. It should be understood that SOC and SOH balancing control is only provided as an example and that other combination of balancing scenarios can be used in the WEDES system described herein.

As described above, the modules can be arranged in a slotted rack (e.g., slotted rack 120 in FIGS. 1A and 1C). The slots in a rack can be located and/or distributed in a vehicle or other machine utilizing wireless power according to this disclosure. Additionally, in order to support higher efficiency and better stability of the WEDES system, one or more of these slots can be placed in locations where they can be swapped during use (e.g., during mid-travel if needed). When possible and needed for longer use cases, additional modules can be carried on the vehicle and swapped during flight.

Optionally, in some implementations, the modules of the WEDES system can be charged on the ground by using a specially designed wireless power charging unit (e.g., external power source 160 in FIG. 1C) that can be installed at a charging station or even as a mobile unit. The wireless power charging unit can take its energy from renewable energy source or any other energy source. The module can be placed on, or even near, the wireless power charging unit, to be charged wirelessly. In addition, the wireless power charging unit can have wireless data communication with the modules being charged (e.g., via wireless data communications system of the module) in order to download the stored data obtained during the usage of the modules to the wireless power charging unit (e.g., on ground station) for further analysis and evaluation on the ground.

The WEDES system can be configured for bi-directional uses in terms of transferring power signals and data signals back and forth between all system components. In other words, in addition to the previously charged modules transferring power, for example to a vehicle or machine, via an on-board slot rack and power subsystem, the modules can themselves be charged through a wired plug such that the power transfer occurs from more than one source. The slotted rack (e.g., slotted rack 120 in FIGS. 1A and 1C) also be configured to serve as a power conduit for the on-board subsystem to the modules to charge them.

Figure 5:
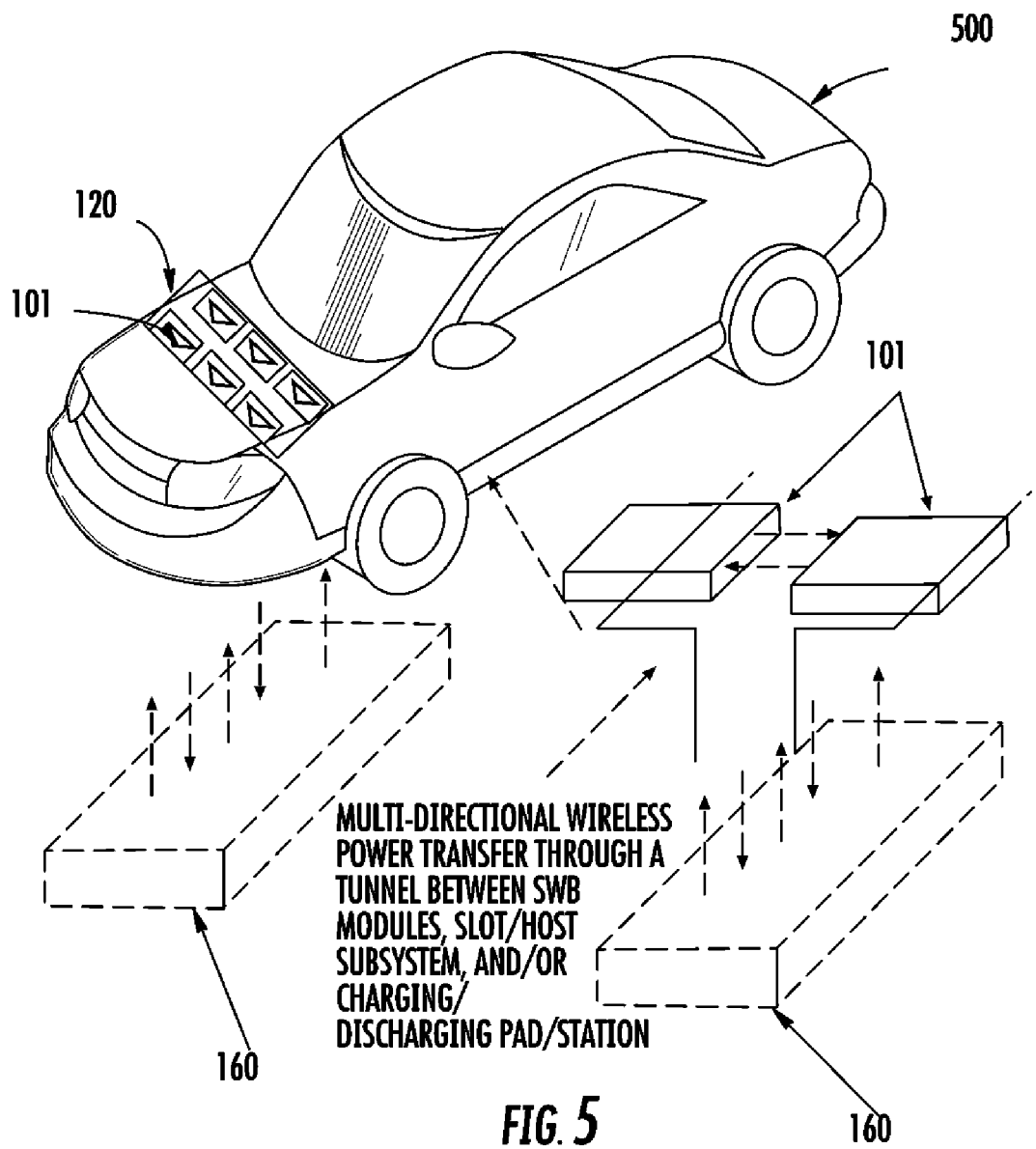
FIG. 5 a schematic diagram of an electric vehicle using a WEDES system.

Referring now to FIG. 5-11, the WEDES system is implemented in various applications. In FIG. 5, a schematic diagram of an electric vehicle 500 using the WEDES system of FIGS. 1A-1C is shown. In FIG. 5, the vehicle 500 includes the slotted rack 120 including one or more wireless module power packs 101. The wireless module power packs 101 are inserted inside their wirelessly distributed and enabled slots in the slotted rack 120, which is equipped with electronics to receive/transmit power/data/control commands and combine power to a power bus as describe herein. Optionally, the slotted rack 120 is part of an on-board module (e.g., on-board module 110 of FIGS. 1A-1C). In FIG. 5, multi-directional power transfer is accomplished through wireless power transfer media between wireless module power packs 101 and/or external power source 160. Additionally, using wireless data transceivers (e.g., SRC and/or LRC modules of FIGS. 1A-1C), the WEDES system can exchange data (e.g., module operating parameters, power/energy management parameters, pricing data, etc.) with a remote server (e.g., remote server 150 in FIG. 1B) according to implementations described herein.

Figure 6:
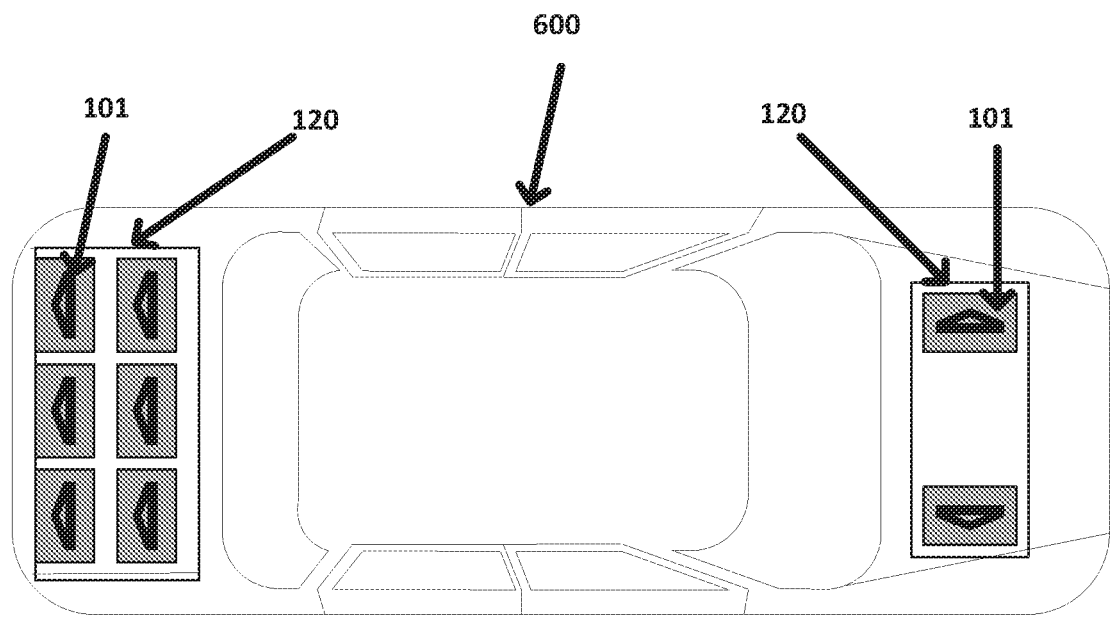
FIG. 6 a schematic diagram of an electric vehicle using a WEDES system.

In FIG. 6, a schematic diagram of an electric vehicle 600 using the WEDES system of FIGS. 1A-1C is shown. The electric vehicle 600 includes a plurality of slotted racks 120, e.g., one in the front and one in the rear of the vehicle. It should be understood that the number and/or location of the slotted racks 120 are provided only as examples. Each slotted rack 120 includes one or more wireless module power packs 101. The wireless module power packs 101 are inserted inside their wirelessly distributed and enabled slots in the slotted rack 120, which is equipped with electronics to receive/transmit power/data/control commands and combine power to a power bus as describe herein. Optionally, the slotted rack 120 is part of an on-board module (e.g., on-board module 110 of FIGS. 1A-1C). Additionally, using wireless data transceivers (e.g., SRC and/or LRC modules of FIGS. 1A-1C), the WEDES system can exchange data (e.g., module operating parameters, power/energy management parameters, pricing data, etc.) with a remote server (e.g., remote server 150 in FIG. 1B) according to implementations described herein.

Figure 7:
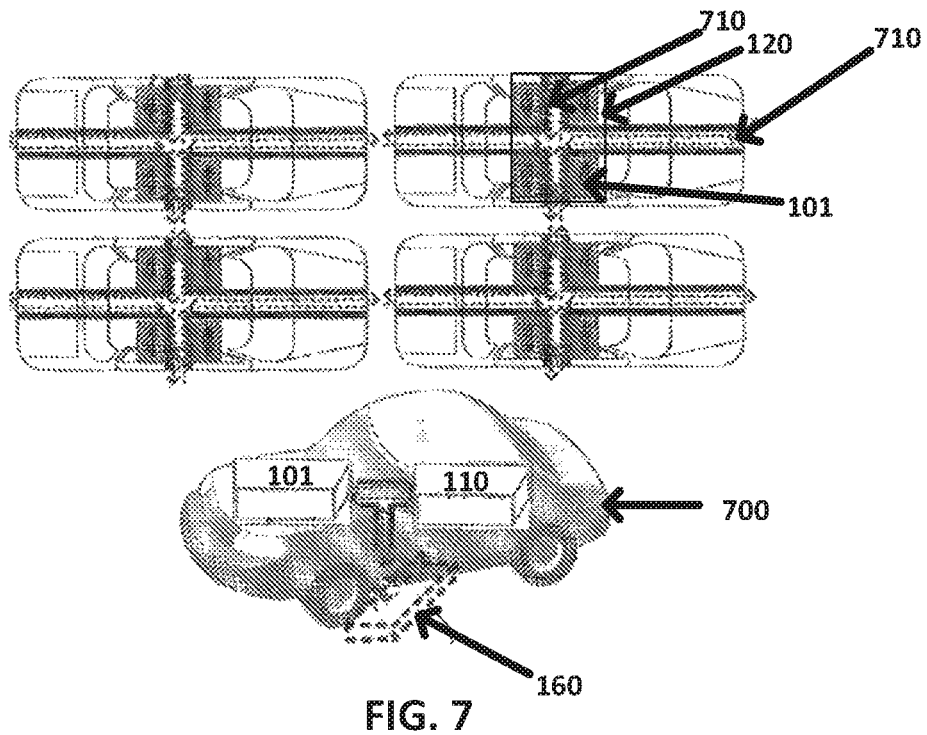
FIG. 7 another schematic diagram of an electric vehicle using a WEDES system.

In FIG. 7, another schematic diagram of an electric vehicle 700 using the WEDES system of FIGS. 1A-1C is shown. The electric vehicle 700 includes a slotted rack 120 having one or more wireless module power packs 101. The wireless module power packs 101 are inserted inside their wirelessly distributed and enabled slots in the slotted rack 120, which is equipped with electronics to receive/transmit power/data/control commands and combine power to a power bus as describe herein. Optionally, the slotted rack 120 is part of an on-board module (e.g., on-board module 110 of FIGS. 1A-1C). Additionally, the WEDES system and/or vehicle 700 can include energy guide formations 710 that receive wireless power from an adjacent source (such as a nearby vehicle or other machine) and direct that power signal through a conduit configured for maximizing power transfer in a particular direction. Additionally, using wireless data transceivers (e.g., SRC and/or LRC modules of FIGS. 1A-1C), the WEDES system can exchange data (e.g., module operating parameters, power/energy management parameters, pricing data, etc.) with a remote server (e.g., remote server 150 in FIG. 1B) according to implementations described herein.

Figure 8:
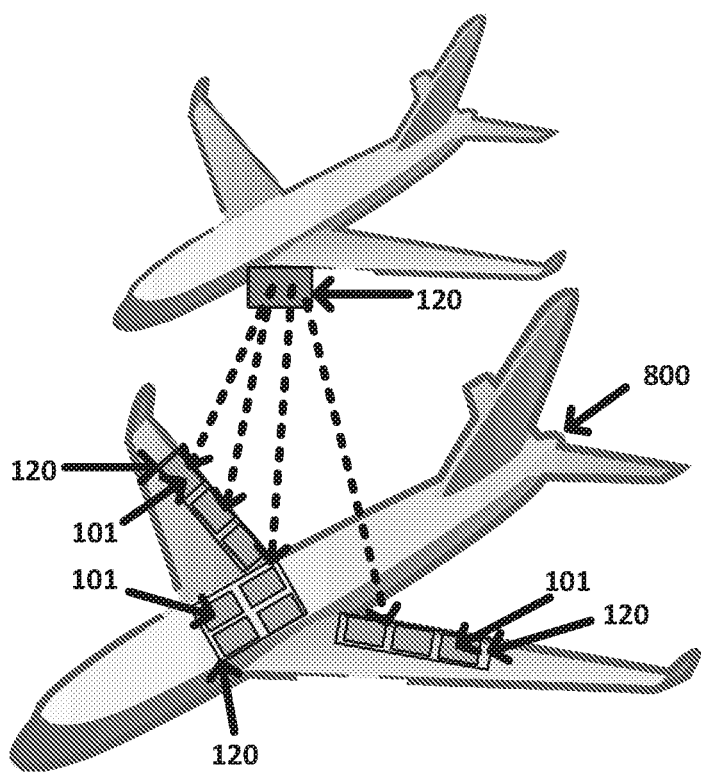
FIG. 8 a schematic diagram of an aircraft using a WEDES system.

In FIG. 8, a schematic diagram of an aircraft 800 using the WEDES system of FIGS. 1A-1C is shown. The aircraft 800 includes a plurality of slotted racks 120, e.g., one in the fuselage and one in each wing. It should be understood that the number and/or location of the slotted racks 120 are provided only as examples. Each slotted rack 120 includes one or more wireless module power packs 101. The wireless module power packs 101 are inserted inside their wirelessly distributed and enabled slots in the slotted rack 120, which is equipped with electronics to receive/transmit power/data/ control commands and combine power to a power bus as describe herein. Optionally, the slotted rack 120 is part of an on-board module (e.g., on-board module 110 of FIGS. 1A-1C). As shown in FIG. 8, the aircraft 800 is undergoing mid-air wireless charging with another aircraft. In other words, the WEDES system facilitates wireless charging the one or more wireless module power packs 101 while powering the aircraft 800 during use (e.g., mid-flight) from another aircraft. This can optionally occur during emergency situations. Although mid-air wireless charging in FIG. 8 is illustrated with respect to aircraft, it should be understood that the WEDES system can be implemented in other vehicles such that wireless charging during use is possible. Additionally, using wireless data transceivers (e.g., SRC and/or LRC modules of FIGS. 1A-1C), the WEDES system can exchange data (e.g., module operating parameters, power/energy management parameters, pricing data, etc.) with a remote server (e.g., remote server 150 in FIG. 1B) according to implementations described herein.

Figure 9:
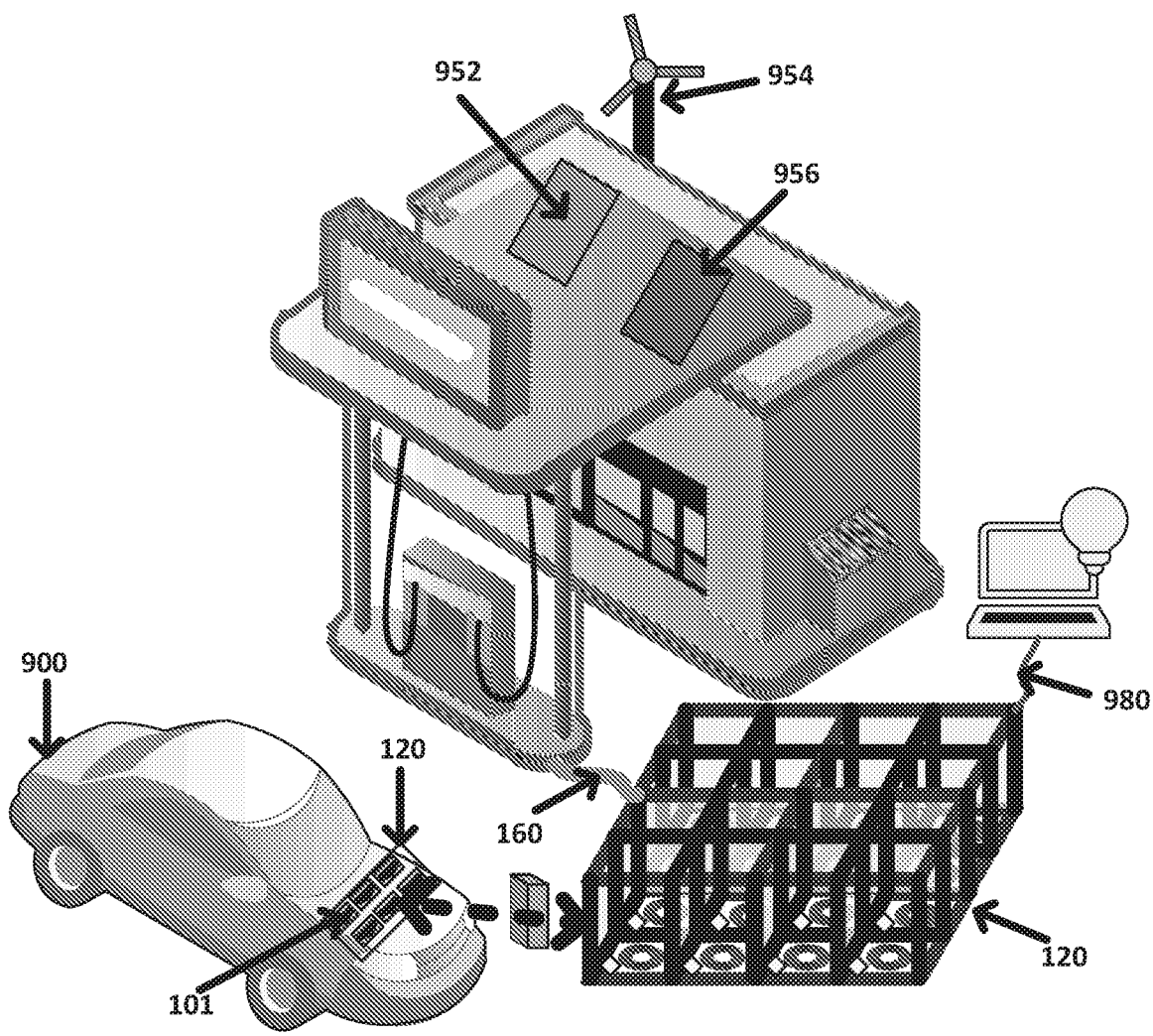
FIG. 9 a schematic view of a retail operation for exchanging power wirelessly with a WEDES system.

In FIG. 9, a schematic view of a retail operation for exchanging power wirelessly with the WEDES system of FIGS. 1A-1C is shown. An electric vehicle 900 includes a slotted rack 120 having one or more wireless module power packs 101. The wireless module power packs 101 are inserted inside their wirelessly distributed and enabled slots in the slotted rack 120, which is equipped with electronics to receive/transmit power/data/control commands and combine power to a power bus as describe herein. Optionally, the slotted rack 120 is part of an on-board module (e.g., on-board module 110 of FIGS. 1A-1C). As shown in FIG. 9, the vehicle 900 is using an external power source 160 at the retail operation (e.g., power or fuel station). The fuel station can store power/energy using renewable sources including, but not limited to, thermal 952, wind 954, and solar 956 sources. Power can be transmitted from the retail operation to the vehicle 900 via the external power source 160. Additionally, using wireless data transceivers (e.g., SRC and/or LRC modules of FIGS. 1A-1C), the WEDES system can exchange data 980 (e.g., module operating parameters, power/energy management parameters, pricing data, etc.) with a remote server (e.g., remote server 150 in FIG. 1B) according to implementations described herein.

Figure 10:
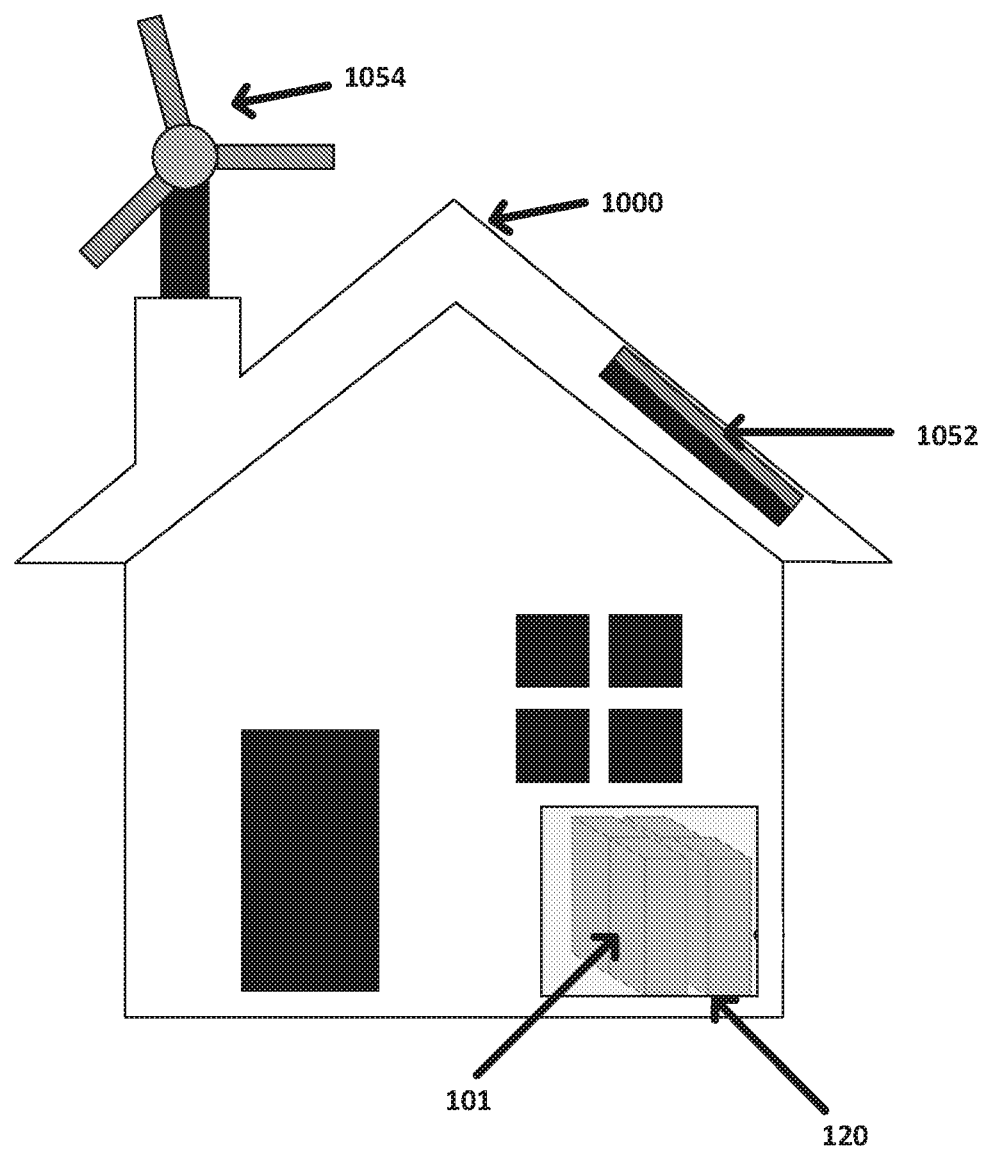
FIG. 10 a schematic diagram of a building (e.g., residential or commercial building) using a WEDES system.

In FIG. 10, a schematic diagram of a building 1000 (e.g., residential or commercial building) using the WEDES system of FIGS. 1A-1C is shown. The building 1000 includes a slotted racks 120 having one or more wireless module power packs 101. The wireless module power packs 101 are inserted inside their wirelessly distributed and enabled slots in the slotted rack 120, which is equipped with electronics to receive/transmit power/data/control commands and combine power to a power bus as describe herein. Optionally, the slotted rack 120 is part of an on-board module (e.g., on-board module 110 of FIGS. 1A-1C). Additionally, the building 1000 can store power/energy using renewable sources including, but not limited to, thermal/solar 1052 and wind 1054. Power can be transmitted from the building 100 to WEDES system via an external power source (e.g., external power source 160 of FIG. 1C). Additionally, using wireless data transceivers (e.g., SRC and/or LRC modules of FIGS. 1A-1C), the WEDES system can exchange data (e.g., module operating parameters, power/energy management parameters, pricing data, etc.) with a remote server (e.g., remote server 150 in FIG. 1B) according to implementations described herein. In this environment, a building-powered unit replacing renewable energy sources with batteries to be charged can use the WEDES system for swapping when additional energy is needed. Optionally, adjacent buildings (e.g., neighbors) can swap/exchange the modules when one needs additional energy or one can pay for modules (e.g., as described with respect to the retail operation). One can also have additional previously charges modules to use as a replacement to the empty ones. Moreover, the solar panels on home roof for example can be wirelessly distributed and enabled modules, while performing maximum power point tracking and energy efficiency maximization. In the case when the external power source is solar, for a home application for example, each solar panel can be placed in a wireless solar panel module and the wireless solar panel modules can be placed and removed in one or more slotted host transceiver (placed on the home roof, near a building, on a vehicle, or a machine for examples) that exchanges wireless power and data with the modules.

Figure 11:
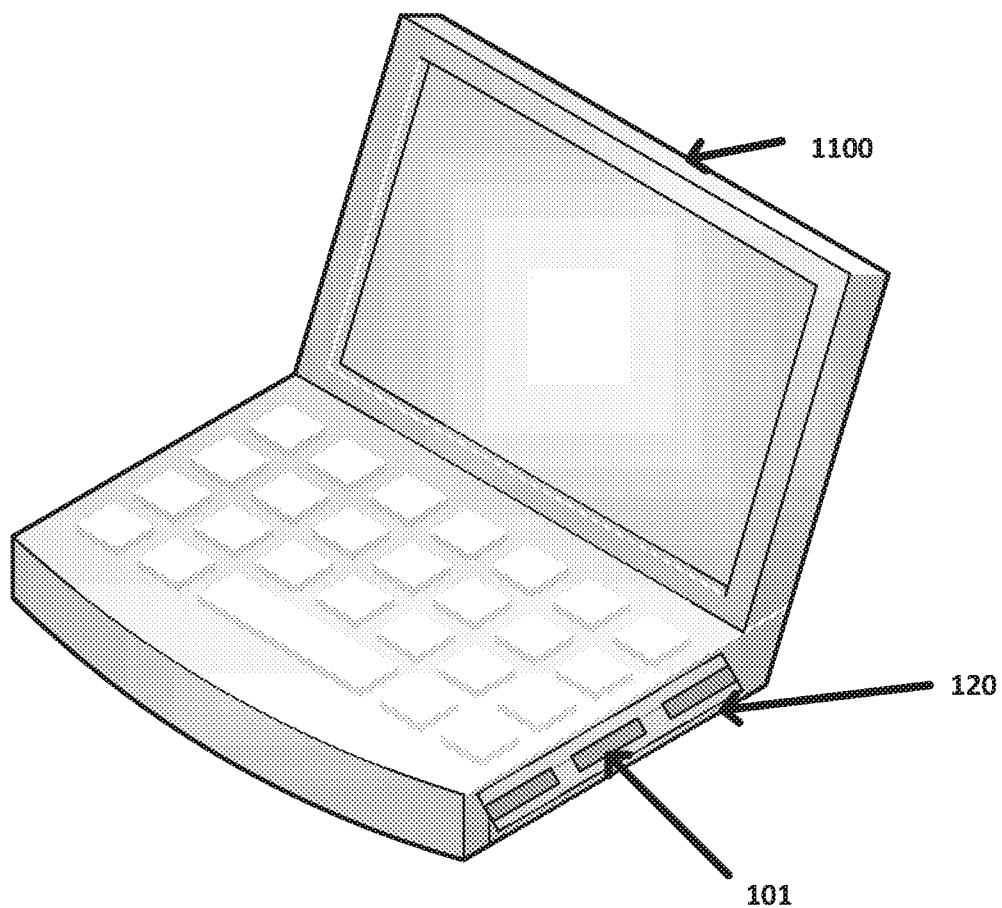
FIG. 11 a schematic diagram of a computing device using a WEDES system.

In FIG. 11, a schematic diagram of a computing device 1100 using the WEDES system of FIGS. 1A-1C is shown. This disclosure contemplates that the computing device 1100 can be a desktop computer, laptop computer, tablet computer, mobile phone, or other type of consumer electronic device. Optionally, the computing device 1100 can be a mobile and/or handheld computing device. The computing device 1100 includes a slotted racks 120 having one or more wireless module power packs 101. Power can be transmitted to WEDES system via an external power source (e.g., external power source 160 of FIG. 1C). Additionally, using wireless data transceivers (e.g., SRC and/or LRC modules of FIGS. 1A-1C), the WEDES system can exchange data (e.g., module operating parameters, power/energy management parameters, pricing data, etc.) with a remote server (e.g., remote server 150 in FIG. 1B) according to implementations described herein.

The WEDES system describe herein is capable of achieving high efficiencies because the distance between each module transmitter/receiver (e.g., wireless power transmission circuit 102 of FIGS. 1A-1C) and the corresponding receiver/transmitter (e.g., wireless power receiver circuit 103 of FIGS. 1A-1C) in the slot/on-board subsystem can be made very short (e.g., few centimeters, or few millimeters, or more/less depending on design criteria of the system). Additionally, each wireless module power pack 101 can be enclosed inside a housing or enclosure, which allows for lower losses and higher efficiencies. For example, the slotted rack can be shielded with material (e.g. ferrite) such that when a module is inserted flux loss is minimal. Moreover, the wireless communication for the data transfer requires very low power when the modules are inserted in the slotted rack host for the same reasons.

As described herein, the WEDES system can be recharged at a retail operation, e.g., at gas stations or similar stations and shops. An example is illustrated with regard to FIG. 9. In this implementation, the wireless module power packs 101 of the WEDES system can be recharged, and it is also possible to (a) download data from the modules (e.g., operating parameters), (2) upload data to and reconfigure the module control and characteristic (e.g., power/energy management parameters and/or control signals), (3) evaluate the SOH and Change in SOH (CH—SOH) of each module and communicate to a central computer or station (e.g., remote server 150 of FIG. 1B), (4) determine the pricing of exchanging one module with another based on factors such as CH—SOH, SOH, SOC, number of charge/discharge cycles, usage profile of the module, and electricity pricing, among others. An algorithm that uses the SOH and CH—SOH as one of the factors in determining the price of the module(s) exchange is described herein. This disclosure contemplates that this algorithm can use data collected during the use of the modules (e.g., voltage, current, SOC, SOH, capacity, etc.) to determine pricing.

Figure 12:
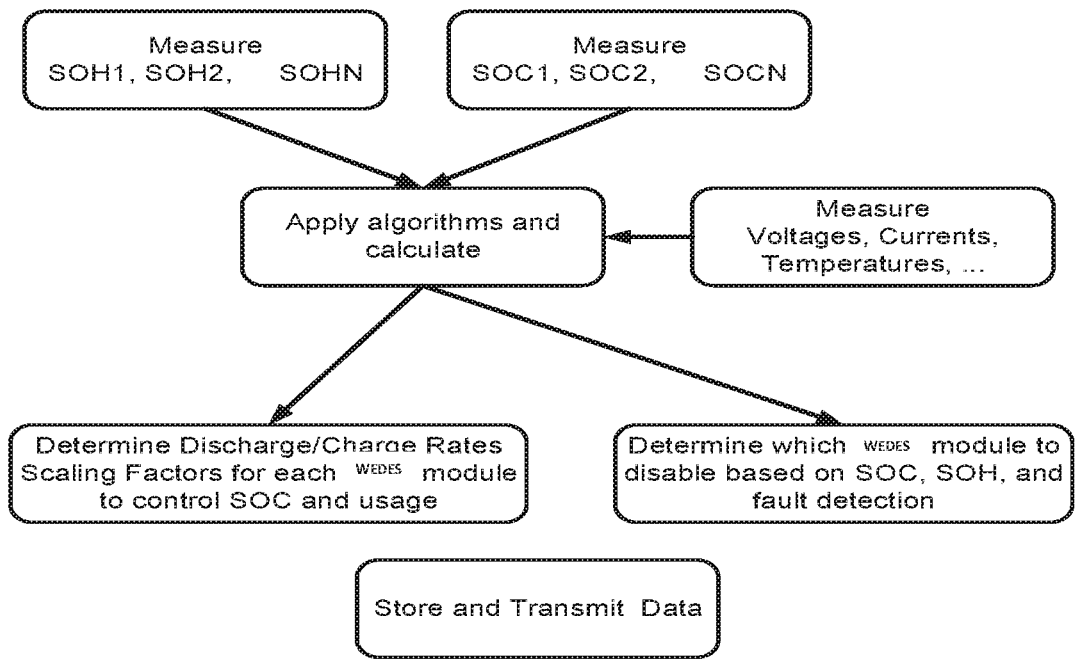
FIG. 12 is a flow chart of an example algorithm used in conjunction with the bi-directional wireless power and wireless data transfer in a WEDES system according to implementations described herein.
Figure 13:
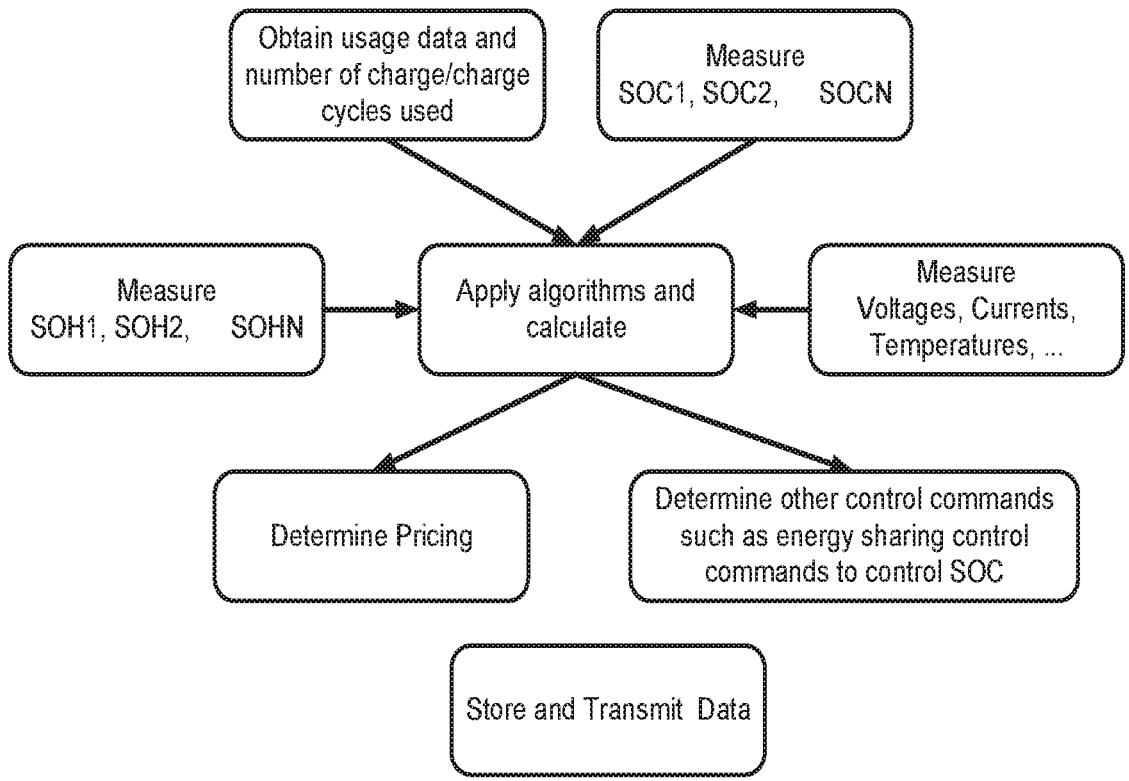
FIG. 13 is a flow chart of an example algorithm used in conjunction with the bi-directional wireless power and wireless data transfer in a WEDES system according to implementations described herein.

In any of the WEDES system implementations described herein, a multi-directional controller (MDC) can manage the flow of energy between the modules, on-board slot subsystem and electronics, a remote server, and/or the charging pad/station during both charging and discharging. This disclosure contemplates that the MDC can be implemented, for example, in a control unit (e.g., control unit 135 of FIG. 1C). Example bi-directional wireless power and wireless data transfer operations are shown in FIGS. 12 and 13. The MDC can control the SOC distribution between the modules to be equal or not equal based on several factors such as SOH, temperature, and the number of modules inserted in the system. If a new module is inserted which has higher SOC than the other modules, the MDC can control the energy flow percentage from each module such that either balanced or desired SOC is achieved for each module. The State-of-Health (SOH) of each of the module and its type is also a factor of the energy use for each module. If the WEDES system detects that a module's SOH is low or about to fail or failed, the particular module can be disable or energy usage from the particular module can be reduced. If one or more modules are disabled, removed, or missing, the WEDES system can combine the energy from the remaining modules and continue to operate. The WEDES system in this case, if needed, can send a command to the vehicle, device, or machine being powered (e.g., the load) to indicate a possible reduction in the maximum peak power/energy available such that the WEDES system can operate at lower power mode if needed. This disclosure also contemplates that the SOC distribution can be achieved by either controlling the percentage energy flow to the load or from the charger, but also by wirelessly transferring energy between the modules. In the latter scenario, a module can be charging another module to control the distribution of the SOC. Example bi-directional wireless power and wireless data transfer operations are shown in FIGS. 12 and 13.

In some implementations, the WEDES system (e.g., one or more components thereof) can include a location tracking unit including, but not limited to, a global positioning system (GPS) chip/module. The WEDES system can have communication chip/module (e.g., SRC and/or LRC of FIGS. 1A-1C) to communicate and exchange data and information through cellular networks, WiFi networks, satellites, and other communication means. The WEDES system can be equipped with analysis units which collect energy usage versus location and other parameters such as temperature, SOC, SOH, and fault probability and occurrence. The SOH analysis and control, SOC analysis and control, and other functions can be done locally (e.g., by the WEDES system, for example, using the control unit 135 of FIG. 1C) and/or on a remote server (e.g., remote server 150 of FIG. 1B). In some implementations, the data and control can be done partially locally and partially remotely and control commands can be exchanged (e.g., between the on-board module 110 and remote server 150 of FIG. 1B). As described herein, the WEDES system can be equipped with analysis units which collect energy usage versus location and other parameters such as temperature, SOC, SOH, and fault probability and occurrence. The multi-directional nature of the WEDES system can be used to exchange power between vehicles, aircrafts, mobile devices, etc.

As described herein, power transmission can be accomplished using different types including coupled wireless transfer such as inductive systems, radiative wireless power such as RF power, ultrasonic wireless power transmission, and light transmission. Additionally, this disclosure contemplates that the WEDES system can include Inductive Wireless Power Transmission and Resonance with Inductive Wireless Power Transmission (magnetically coupled). This can be implemented using two-coil system, four-coil system, or multi-coil systems. When the WEDES system includes, for example, a four-coil system it does not necessarily imply multiple transmitters and multiple receivers, the terminology is used also to indicate that there the single transmitter structure is made out of two coils.

As an example distributed control algorithm, a SOH evaluation method (for electrochemical batteries like Lithium Ion batteries) can be used as described below:

1) SOH=Ca/Cr, where Ca is the currently available/usable capacity and Cr is the rated capacity of the battery.

2) SOH is determined based on the change of the Electrochemical Impedance of the battery (usually higher impedance means lower SOH).
3) SOH=1−[Used charge/discharge cycles divided by maximum specified charge/discharge cycles]. For example, if a battery is used/discharged 30 times and the specifications say it can live for 300 cycles, then 1−[30/300]=90% healthy (assuming new battery 100% healthy).

Figure 14:
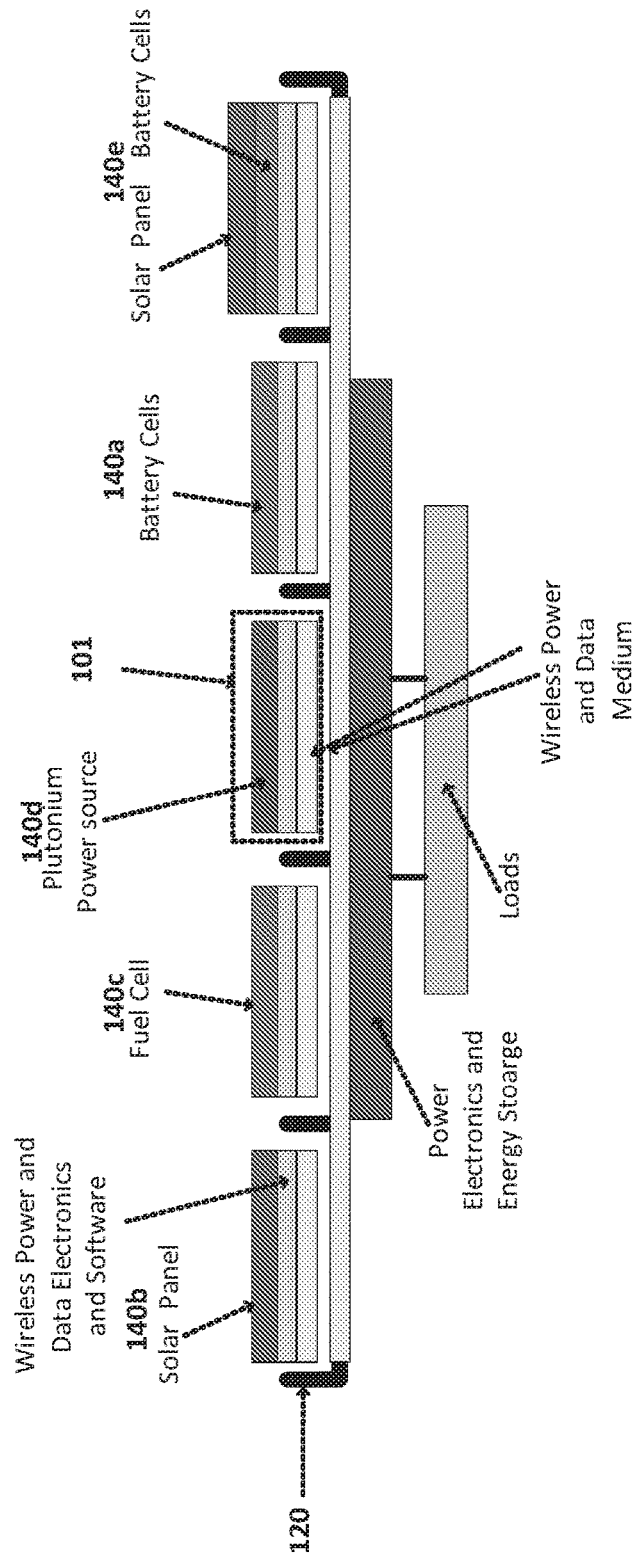
FIG. 14 is a schematic diagram of a slotted rack that accepts wireless module power packs with different types.

In some implementation, one or more of the wireless module power packs 101 in the WEDES system can be of different type. For example, a WEDES system with four (4) wireless module power packs 101 can include one module with batteries, one module with fuel cell, one module with supercapacitors, and one module with Plutonium Power source. Alternatively or additionally, FIG. 14 illustrates a slotted rack 120 that accepts wireless module power packs 101 with different types. For example, a first module can include a battery 140a, a second module can be wireless solar panel module 140b, a third module can be a wireless fuel cell module 140c, a fourth module can be a wireless nuclear energy based module 140d, a fifth module can be a wireless solar panel/battery module 140e. It should be understood that the number and/or type of modules described above are only provided as examples. The WEDES module can include any number of modules, and the modules can be of the same and/or different type.

As described herein, a vehicle may requires a battery energy storage system with X kWh rating, and this battery can be divided/broken down into N battery modules each with Y=X/N kWh rating (in this example equal rating for all modules are assumed but unequal ratings is also an option). This is such that each smaller battery module has a lower weight and is easier to carry or handle. Vehicles with a plurality of wireless module power packs 101 are shown in FIGS. 6, 7, and 8 for example. It should be understood that these are provided only as examples and that the WEDES can be implemented in other applications including, but not limited to, buildings (e.g., as shown in FIG. 10) or electronic devices (e.g., as shown in FIG. 11).

In the examples provided below, each of the modules is referred to by WEDES-MX modules. An example WEDES-MX module is shown in FIG. 1B (e.g., wireless module power packs 101). Each WEDES-MX module is completely enclosed with no electrical connections to the outside. In order to make this possible, each WEDES-MX modules is wirelessly enabled by both Wireless Power Transfer (WPT) and wireless communications. WPT is used to transmit and receive power/energy from and to each WEDES-MX modules. This can be implemented using the wireless power transmission and receiver circuits 102, 103 shown in FIGS. 1A-1C. Wireless communications is used to communicate information for measurements, control, analysis, and tracking, among others. This can be implemented using the SRC 300 and/or LRC 350 shown in FIGS. 1A and 1B. The WEDES-MX modules are inserted in the slotted rack 120 (also referred to herein as "Slotted Receiver Unit (SRU)"). The SRU can be provided in a vehicle, for example in an electric vehicle (EV), in order to combine the energy from all WEDES-MX modules to power the EV and communicate information with the on-board module 110 (also referred to herein as "On-Board (OB) Module"). SRU also exists in charging stations ("gas stations") to charge the WEDES-MX modules. The charging station can charge the WEDES-MX module 101 from renewable energy sources such as solar and wind, among others (e.g., as shown in FIG. 9).

As described above, FIG. 1B illustrates the basic high-level architecture of the WEDES system during discharging or energy delivery operation. The WEDES-MX modules or wireless module power packs 101 can optionally include the energy storage source (e.g., battery in this example, but could be others such as fuel cells . . . etc.), power electronics which performs power/energy regulation, WPT unit or wireless power transmission circuit 102, module-level controller, and low-power short-range communication (LP-SRC) unit or SCR 300a. The WEDES-MX modules 101 can change (e.g., be swapped) as a result of exchange/swap and/or addition/removal of new/old ones. The on-board module or OB module 110 (part of the EV in this example) includes a WPT unit or wireless power receiver circuit 103, power electronics, OB-level main controller, low-power short-range communication (LP-SRC) unit or SRC 300b and long-range communication (LRC) unit 350a (e.g. cellular and/or Wi-Fi). An optional remote Central Database and Control (CDC) unit or remote server 150 includes long-range communication unit 350b, data storage, high performance computing and data analysis software (for many EVs and their WEDES-MX modules).

Figure 15:
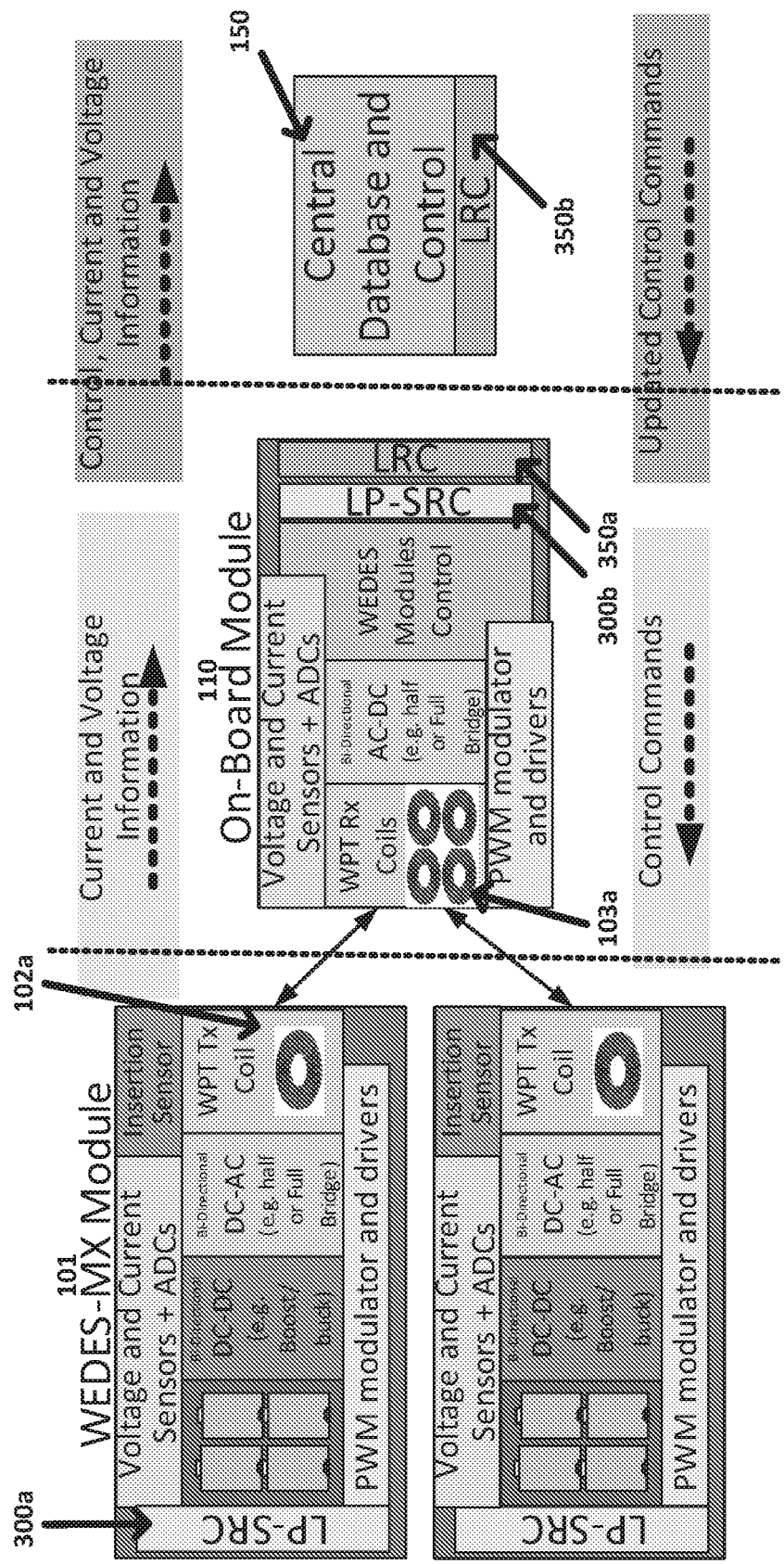
FIG. 15 is another block diagram of an example WEDES system according to implementations described herein.

Referring now to FIG. 15, a block diagram of an example WEDES system is shown. A number of the components of the WEDES system of FIG. 15 are described above and are therefore not described again in detail below. The energy transfer between each WEDES-MX module 101 and the OB module 110 occurs by WPT over a short distance, which guarantees high power transfer efficiency. The DC power of the batteries is inverted to AC power by means of DC-AC power electronic inverter, which can include a DC-DC stage for regulation and a DC-AC stage for inversion, as illustrated in FIG. 15. The power electronics of the OB module 110 can include a AC-DC rectifier, as illustrated in FIG. 15. This rectifier could be a diode bridge rectifier if it is desired that the energy transfer only occurs from the WEDES-MX modules 101 to the OB module 110 to power the EV. However, if the option of changing the EV battery by plugging the EV to an outlet through the OB module 110 to the WEDES-MX modules 101, a transistor bridge (full bridge or half bridge) can be used. It should be understood that the power electronics architecture inside the WEDES-MX modules 101 and/or the OB module 110 in FIG. 15 are provided only as examples and that the power electronics architectures can be different and there are many options.

Referring now to FIGS. 1B and 15, when inserted in a slot of the slotted rack 120, each WEDES-MX module 101 sends its state values (e.g., shown by reference character 200 in FIG. 2) to the OB module 110 through the LP-SRC unit 300a. Example state values are shown in FIG. 2, for example the battery current value (Ibat), the battery voltage value (Vbat), the DC-DC power converter output voltage value (VDC), and the State-Of-Charge (SOC) value (a percentage of the capacity that decreases as the battery is discharged), temperature (T). The OB module 110 calculates power/energy management parameters values for each WEDES-MX module 101, performs control functions and sends commands back to each WEDES-MX module 101 to control their operation. For example, based on the SOC values, the OB module 110 sends the reference value of VDC for each WEDES-MX module 101 it needs to operate at. This is also shown in FIG. 2, for example by reference character 205. The amount of energy drawn from each WEDES-MX 101 is controlled by varying its VDC reference value (in this example) and therefore SOC balancing or control can be achieved. SOC balancing or control can be accomplished using techniques described in U.S. Pat. No. 9,368,991, issued Jun. 14, 2016, the disclosure of which is incorporated herein by reference in its entirety. It should be understood that SOC balancing or control as described in U.S. Pat. No. 9,368,991 is provided only as an example and that other known control techniques can be used in accordance with this disclosure. For example, FIG. 3 illustrates alternative control techniques. At the same time, the sum of all VDC values are set such that the OB module 110 output voltage which supplies the EV with a DC bus voltage is maintained regulated without the need for additional on-board electronics for regulation (while maintaining SOC control at the same time) using similar concept as in reference.

If a WEDES-MX module 101 is added or removed, the OB-level controller of the OB module 110 is able to adjust the needed VDC from each WEDES-MX module 101 in order to maintain the regulation of the EV bus voltage while realizing SOC control. Other parameters exchanged between each WEDES-MX module 101 and the OB module 110 are such as temperature, impedance and capacity values to be used for real-time State-Of-Health (SOH) measurements for advanced power management and control. In some implementations, the OB-level controller may have limited practical processing capability (e.g., limited speed, resolution/accuracy, and/or storage) and may perform control functions and data analysis with limited basic abilities. Otherwise, the vehicle cost including such OB module 110 may be much higher and not economically feasible. In other words, the OB-level controller may not practically capable of performing highly complex and data intensive calculations. Instead, such complex and data intensive calculations can optionally be performed by the remote server 150. The OB module 110 and the remote server 150 can exchange data using the LRCs 350. This data exchange is also shown in FIG. 2, for example by reference character 210.

While the OB module 110 locally performs basic needed managements and controls, it also sends the measured data, status, and control parameters to a remote server or Central Database and Control (CDC) unit 150 for additional (and in some cases more accurate and more complex) long-term analysis, storage, and control. This data exchange can be accomplished through the LRCs 350. The CDC unit 150 opens the door for additional functions and improvements. The CDC unit 150 can maintain a historical record of the characteristics of each WEDES-MX module 101 (which can be identified by a unique identifier number or code as described above) and with which EV or OB module 110 it was used with as it moves between multiple EVs as a results of swapping or replacement. The CDC unit 150 can perform more accurate and complex calculations/analysis (e.g. capacity change and SOH) which is also strengthened by historical data that are not practical to be performed by the OB module 110 or a WEDES-MX module 101. Over the years, researchers have developed better analysis and control algorithms that are unfortunately too complex to be realistic for on-board implementation. These now can be suitable because of the CDC unit 150. The CDC unit 150 can update the OB module 110 and each WEDES-MX module 101 through the OB module 110 it is being used with by more accurate parameters such as more accurate capacity of each WEDES-MX (which decreases by time and age) such that a more accurate SOC is obtained (which is important for the performance and safety of the WEDES system) and the SOH of each WEDES-MX module 101 which is important for safety and can be used for advanced control functions. The CDC unit 150 can generate more adaptive and dynamic pricing for the WEDES-MX module 101 exchange based on its actual capacity, health, and cost of charging.

It should be understood that while the above description has focused on the scenario when the WEDES-MX modules 101, OB module 110, and CDC unit 150 are being used, controlled and updated during discharging operation, the case is similar to the scenario when the WEDES-MX are being charged in a charging unit at a station, home, or in the EV. The data is also collected in this case and control functions using SOC, capacity, SOH, and temperature parameters among others are also used for and during charging.

As described above, an insertion sensor such as a capacitive proximity sensor in a WEDES-MX module 101 and/or an insertion sensor (e.g., position sensor 106 in FIG. 1A) in the OB module 110 are used to indicate an insertion (or removal) of a module and initiate data exchange via the LP-SRC 300 between a WEDES-MX module 101 and the OB module 110 (and activates power transfer). Among the first information that a WEDES-MX module 101 provide to the OB module 110 is its unique ID (WID-i) (e.g., as shown in FIG. 2). This WID-i together with the OB module 110 unique ID (OBID) (e.g., as shown in FIG. 2) are communicated to the CDC unit 150 in order to communicate the information that corresponds to the specific WEDES-MX modules 101 used with the specific OB module 110. When a WEDES-MX module 101 is used in another EV, the CDC unit 150 will have the information of this WEDES-MX module 101 and sends it to the new OB modules 110 of the new EV.

Referring now to FIG. 2, example wireless communications information flow among the WEDES-MX modules 101, the OB module 110, and the CDC unit 150 are shown. FIG. 2 illustrates the example parameters of the system and related data flow between the WEDES-MX modules 101, the OB module 110, and the CDC unit 150 through LP-SRC unit 300 and LRC unit 350. These data are used by OB module 110 to operate the WEDES system. The WEDES-MX modules 101 and the OB module 110 need accurate information of the capacity of each WEDES-MX module 101 (total N modules) in order to calculate each corresponding SOC value for operation. The SOC values are then used by the OB module 110 controller to determine each VDC value that each WEDES-MX module 101 needs to operate at in order to control the discharge rate based on parameters such as the capacity of each WEDES-MX module 101 and its age or SOH. Each WEDES-MX module 101 is different because WEDES-MX modules 101 move between different EVs as they are exchanged and recharged. The modules may have different actual capacity values because of how many times each of them was charged/discharged and their SOH values (as they age), how the modules were used based on different driving habits and temperatures, and what type/size of batteries are used in each module (note that as battery and power electronic technologies advances a newer design generation module with the same size is expected to have higher capacity and one system might have modules from different design generations).

Accurate SOC values require not only accurate capacity values, but also accurate calculation of how much charge is being deducted from each WEDES-MX module 101 as it discharges. This used/deducted charge is calculated by the WEDES-MX module 101 and the OB module 110 based on the current (and maybe voltage based on the method used) information provided by each WEDES-MX module 101. The CDC unit 150 provides capacity values updated the OB module 110 (using LRC 350) and the WEDES-MX modules 101 (using LP-SRC 300).

For additional (optional) analysis by the CDC unit 150 (and some by the OB module 110), raw voltage and current data can be sent from each WEDES-MX module 101 to the CDC unit 150 through the OB module 110. In order for the CDC unit 150 to perform additional advanced and accurate SOH estimation of each WEDES-MX module 101 such that each WEDES-MX is utilized based on its health, and also be able to predict a potential upcoming fault in order to take an action for example by disabling the use of a WEDES-MX module 101 and informing the driver, real-time Electrochemical Impedance Spectrum (EIS) can be obtained and analyzed by the CDC unit 150. To obtain EIS, sinusoidal perturbation by the power converter of each WEDES-MX module 101 is obtained as described in U.S. Pat. No. 9,368,991. The technique described in U.S. Pat. No. 9,368,991 is provide only as an example and other techniques may be used. The perturbation for EIS needs to be activated at a very slow rate (e.g. every 20 minutes), for a short period of time (e.g. for 2 seconds duration), but would require sampling the voltage and current of a WEDES-MX battery at a faster sampling rate (e.g. 1-10 times the switching frequency). Such data can be transferred to the OB module 110 and then to the CDC unit 150 at a slower rate during the period where there is no perturbation (e.g. 2 second of data can be transferred over 20 minutes). Other information to be exchanged between the WEDES-MX modules 101, OB module 110, and CDC unit 150 such as temperature and time/date stamp are all low rate data.

The digital embedded system implementation of the controller makes it a sampled-time/data system, which implies that the discrete-time transfer functions (G(z) for example) of different system blocks and the control loop-gain vary as a function of the sampling rate, and therefore both the absolute stability and the relative stability may be affected. In the WEDES system, there is more than this fact. Because the measured/sensed data and control commands are exchanged wirelessly, a possible wireless data rate changes affect the effective sampling rate, this will also affect the absolute stability and the relative stability because the poles and zeros of different loop-gain transfer functions. To compensate for this, the compensators transfer functions (embedded on the WEDES-MX modules 101 and OB module 110) can be adjusted and tuned adaptively in order to maintain performance.

Example data sharing and/or analysis methods are also described herein. The data sharing and/or analysis methods described below can be implemented using the WEDES-MX modules 101, the OB module 110, and/or the CDC unit 150. In some implementations, the CDC unit 150 (e.g., a remote server) dynamically generates the pricing of swapping, exchanging, buying, and/or charging the WEDES-MX modules 101 for different locations based on the energy source price and availability, and/or the data collected by the WEDES system such as the actual capacity and health of the WEDES-MX modules 101, among others.

Figure 16:
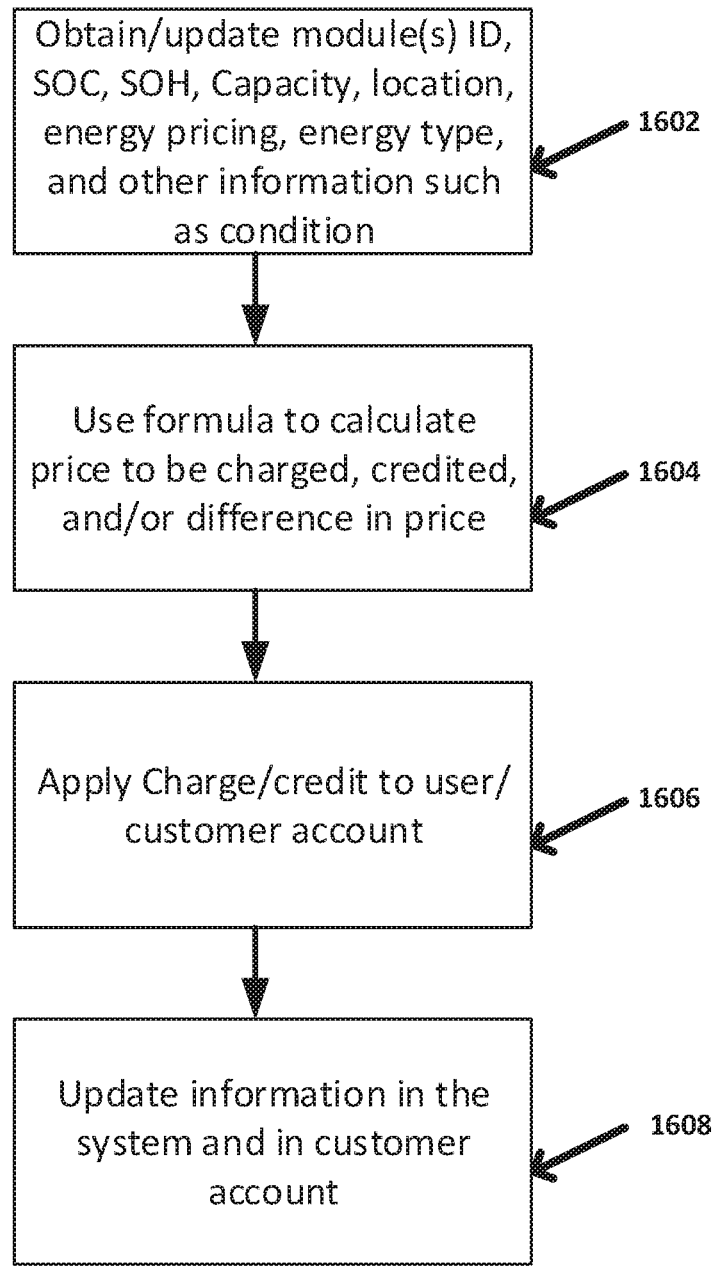
FIG. 16 is a flow diagram illustrating example operations for a dynamic pricing algorithm according to an implementation described herein.

For example, this disclosure contemplates implementing a payment system using a remote server (e.g., CDC unit 150). Users can be provided with accounts that are automatically charged when the user swaps/exchanges/buy a WEDES-MX module(s) 101 based on a unique credential (e.g., username, password, device, or card). Optionally, the automatic payment can be based on a unique identifier of the OB module 110 in the EV, building, aircraft, etc. Example operations for a dynamic pricing algorithm are shown in FIG. 16. At 1602, data is exchanged among the WEDES-MX modules 101, the OB module 110, and the CDC unit 150 as described herein (e.g., example data exchange in shown in FIG. 2). At 1604, the price to be charged for the exchange can be calculated, e.g., by the CDC unit 150. As described herein, charging and pricing factors can be an energy unit price, a user account debit amount, or a user account credit amount. Charging and pricing factors can be calculated using a state of charge (SOC) of the at least one of the wireless power modules. Alternatively or additionally, charging and pricing factors can be calculated based on a difference between the SOC and an amount of power transferred to the at least one of the wireless power modules. For example, the charging and pricing factors can be calculated based on a difference between the SOC or capacity of the at least one of the wireless battery modules and a SOC or capacity of a new wireless power module. Optionally, the charging and pricing factors can be further calculated based on a state of health (SOH) of the at least one of the wireless power modules. At 1606, the transaction (e.g., credit/debit) can be applied against a user's account, e.g., by the CDC unit 150. At 1608, the user's account can be updated to reflect the transaction, e.g., by the CDC unit 150.

Figure 17:
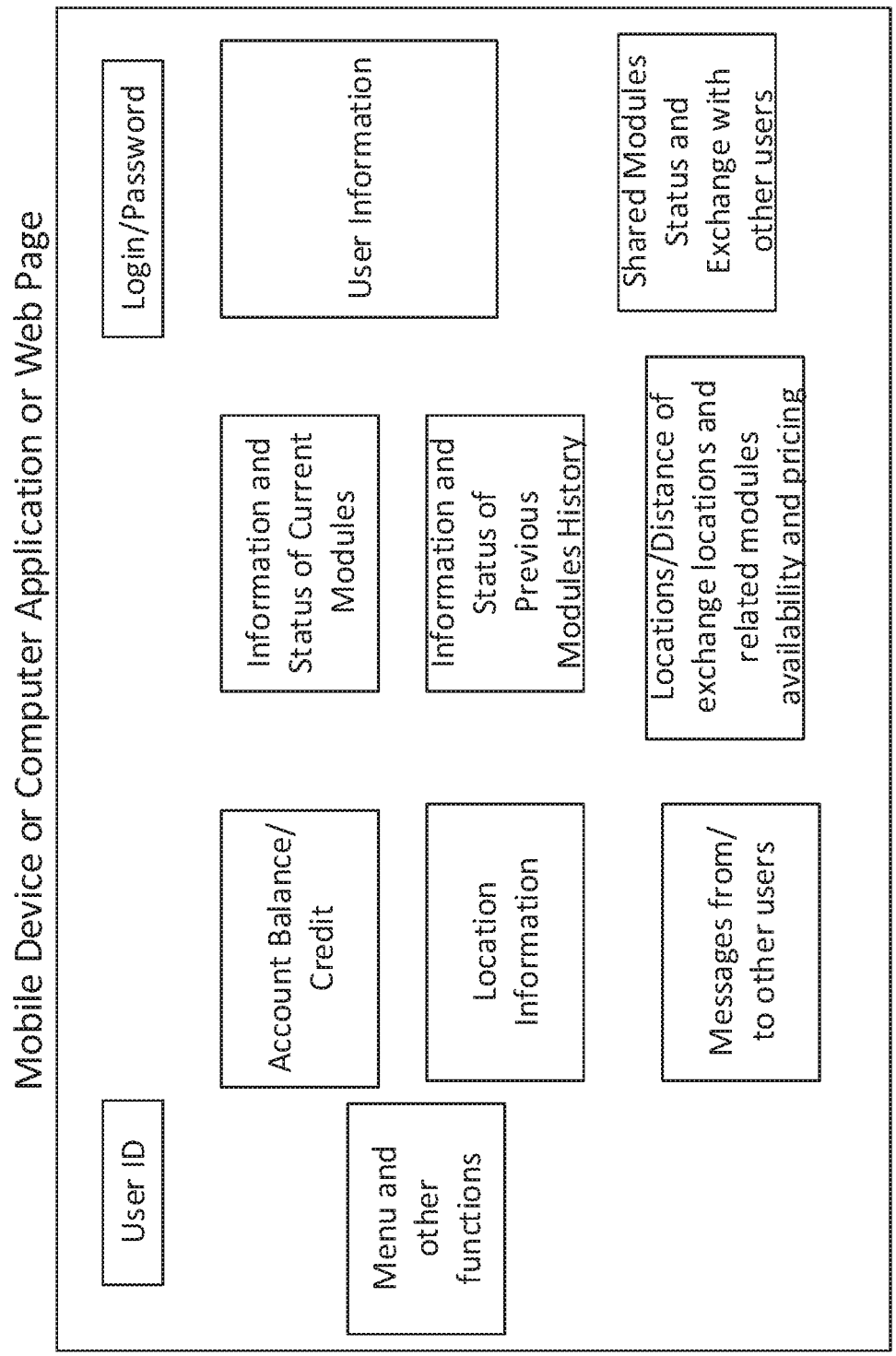
FIG. 17 is a block diagram illustrating an example user interface according to an example implementation.
Figure 18:
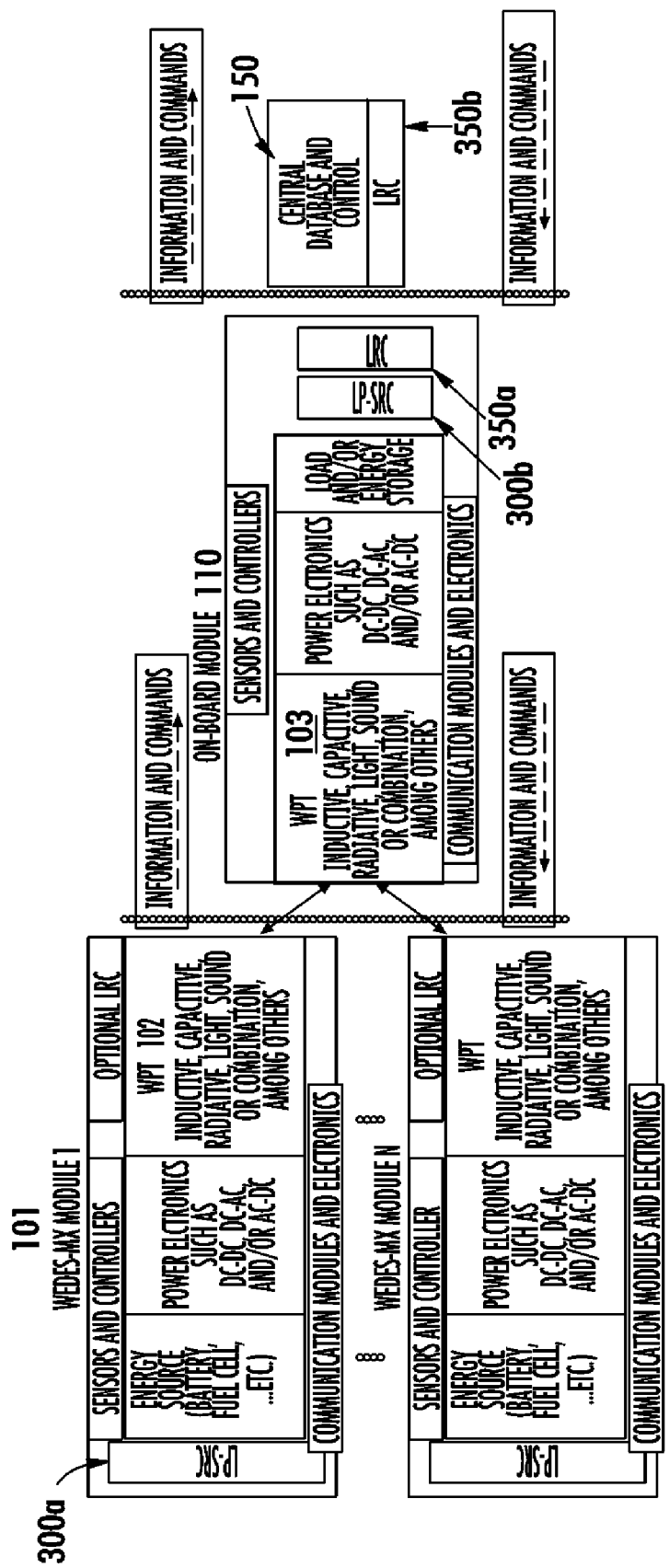
FIG. 18 is another block diagram of an example implementation of WEDES system according to implementations described herein.
Figure 19:
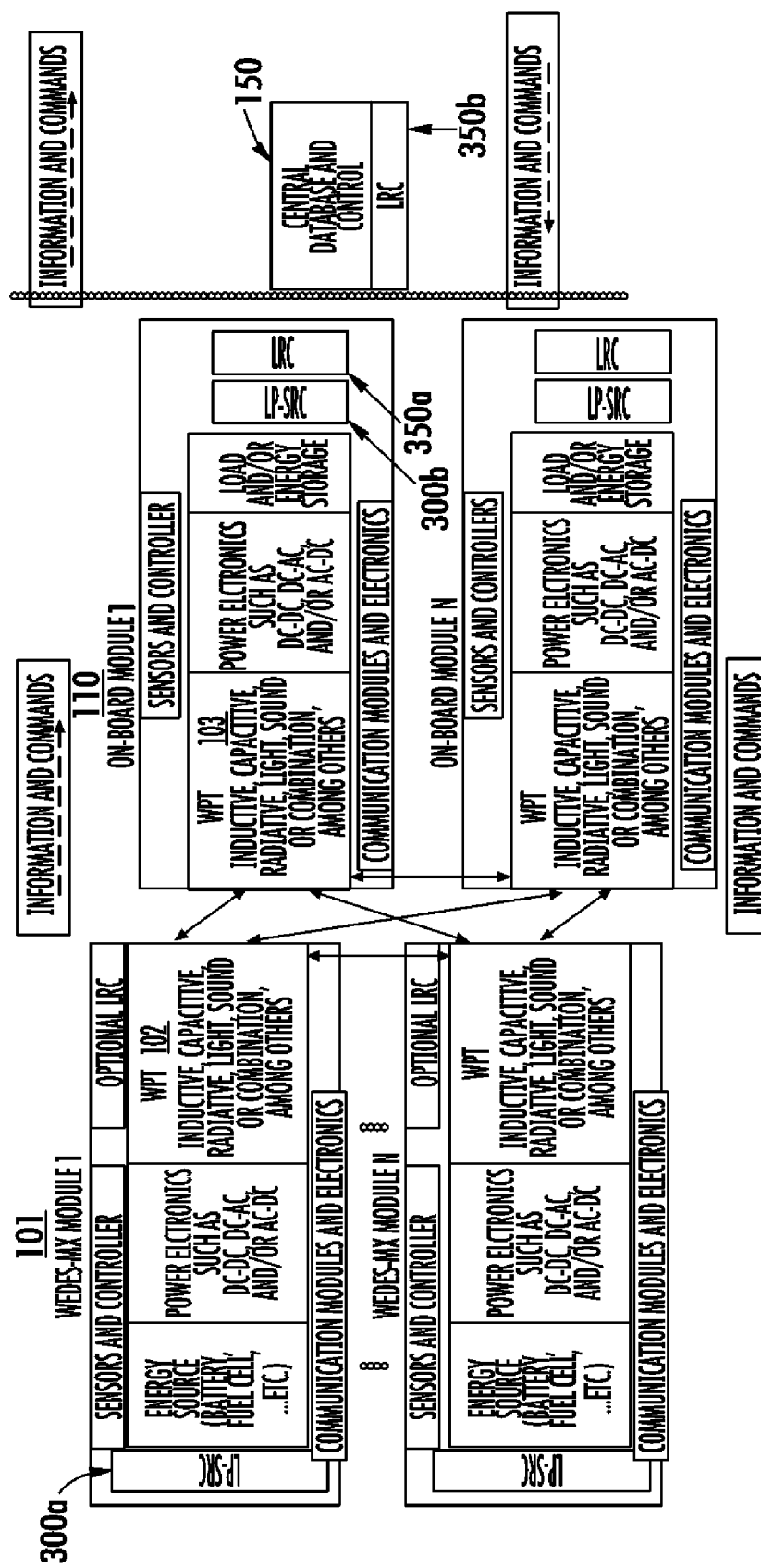
FIG. 19 is another block diagram of an example WEDES system according to implementations described herein.
Figure 20:
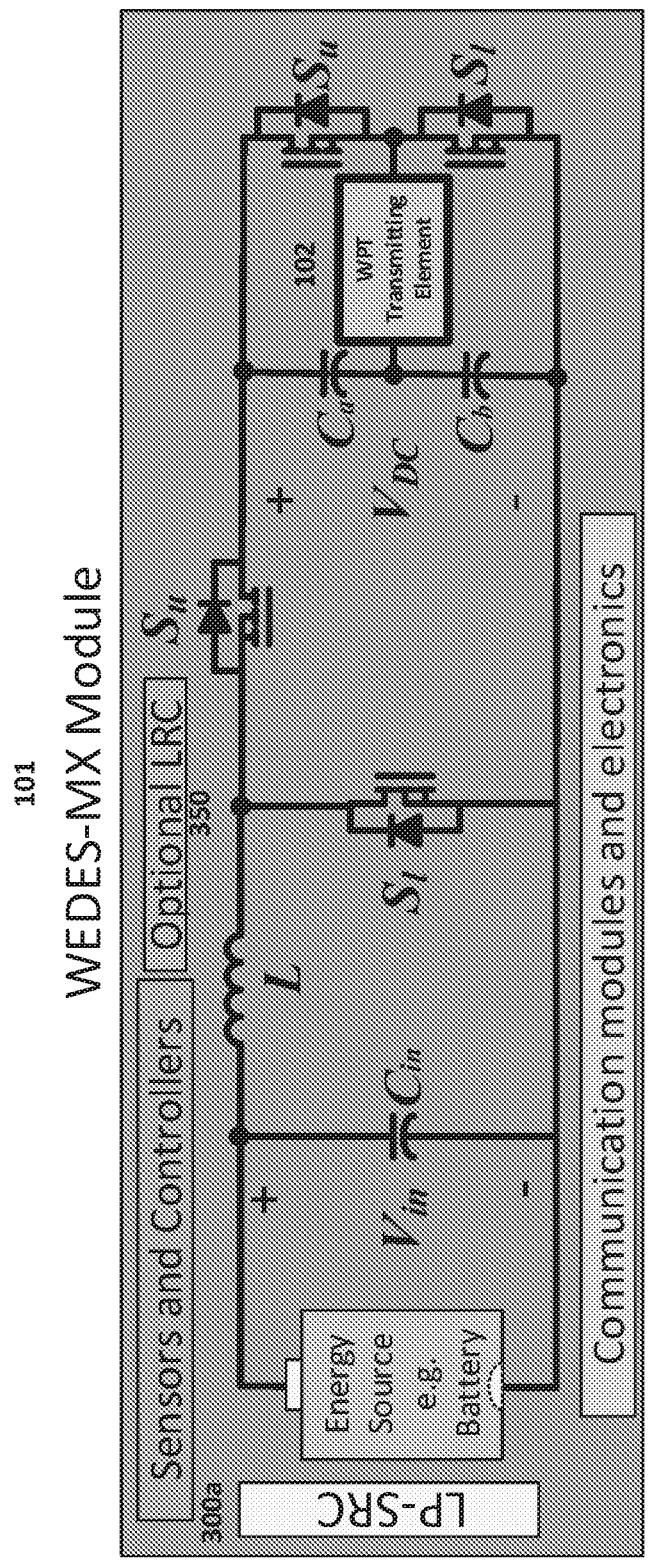
FIG. 20 illustrates a block diagram of an example DC-AC power conversion circuit which can be used in a WEDES-MX module with a battery according to implementations described herein.
Figure 21:
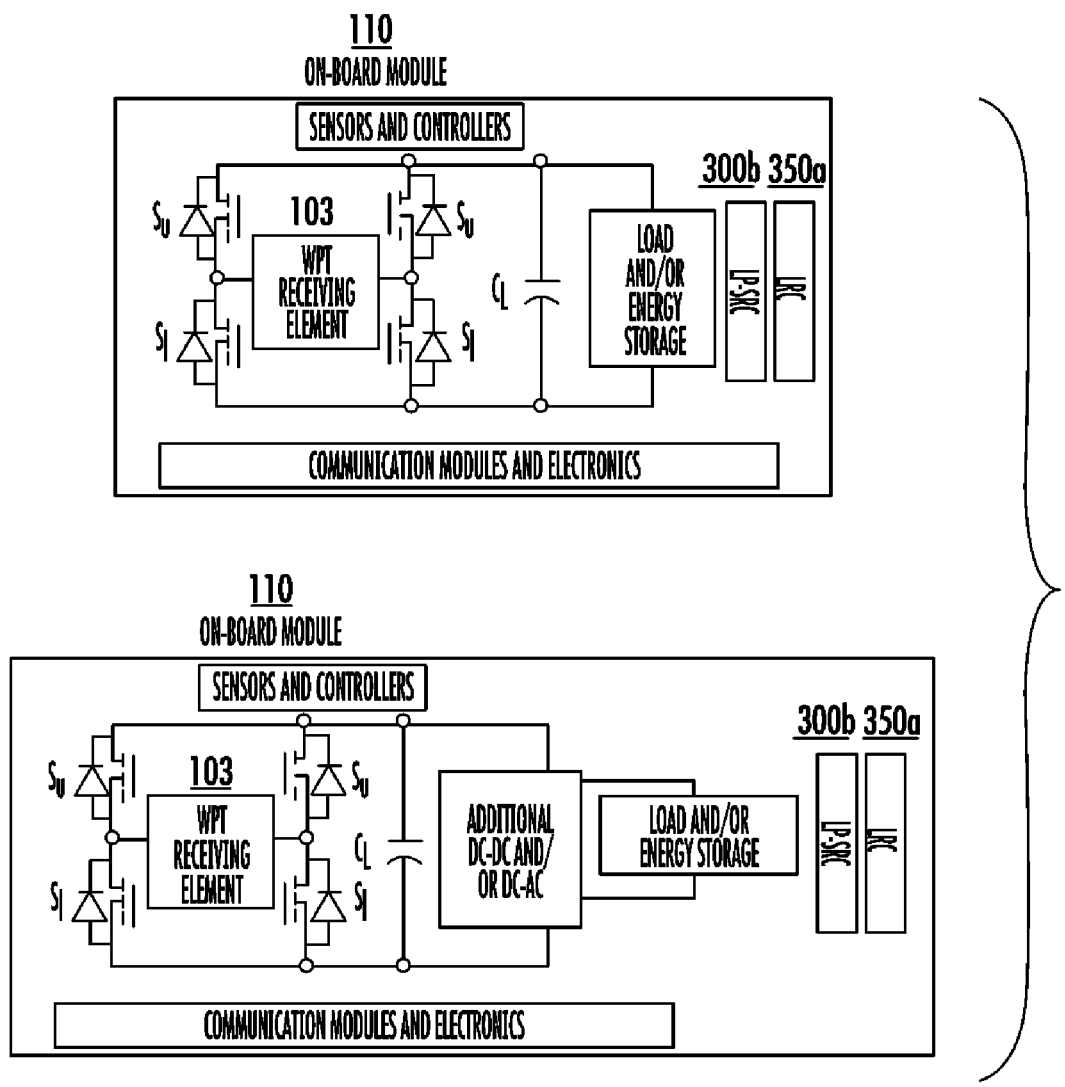
FIG. 21 illustrates block diagrams of example AC-AC and AC-DC power conversion circuits and systems which can be used in the on-board modules according to implementations described herein.
Figure 22:
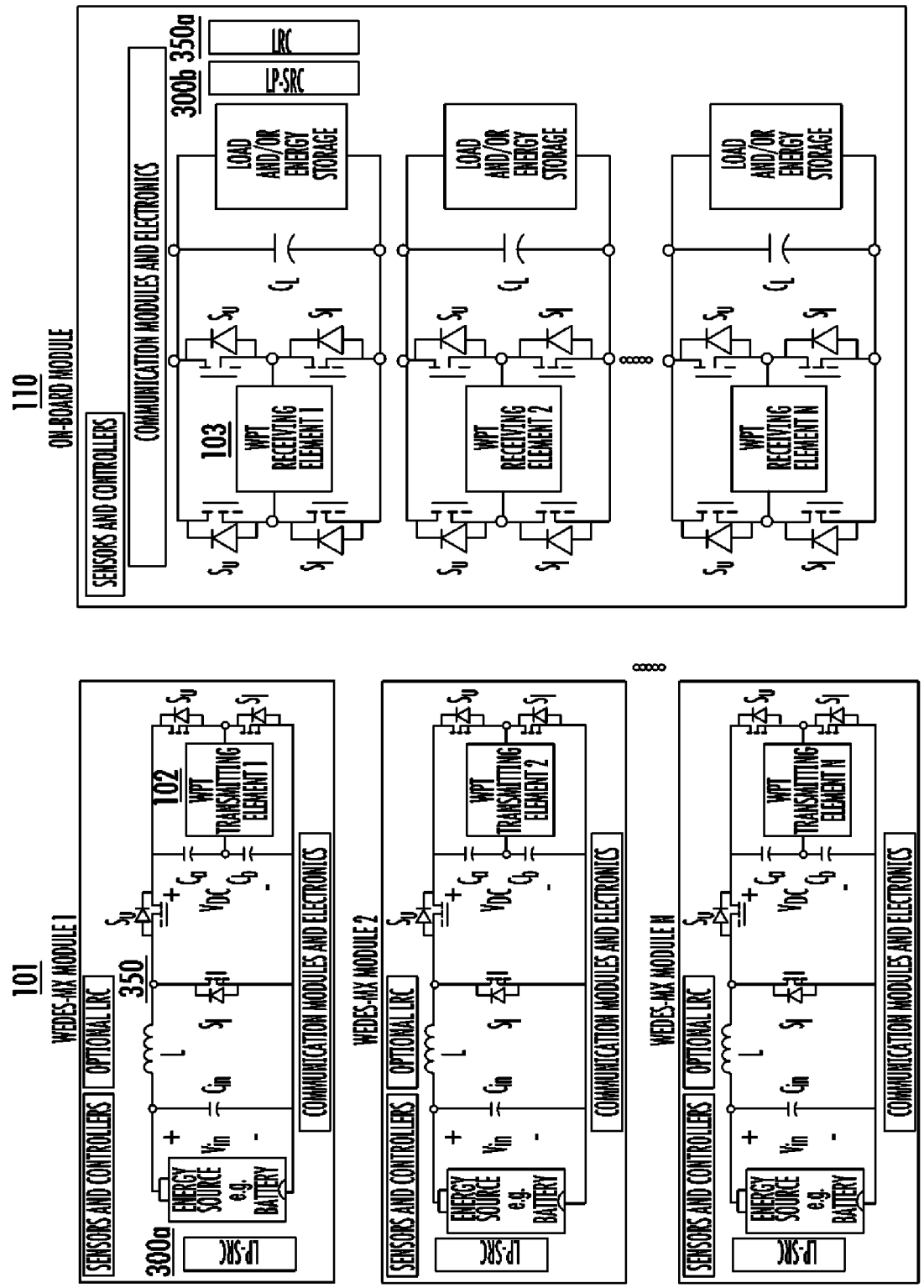
FIG. 22 is a block diagram of an example WEDES system according to implementations described herein.
Figure 23:
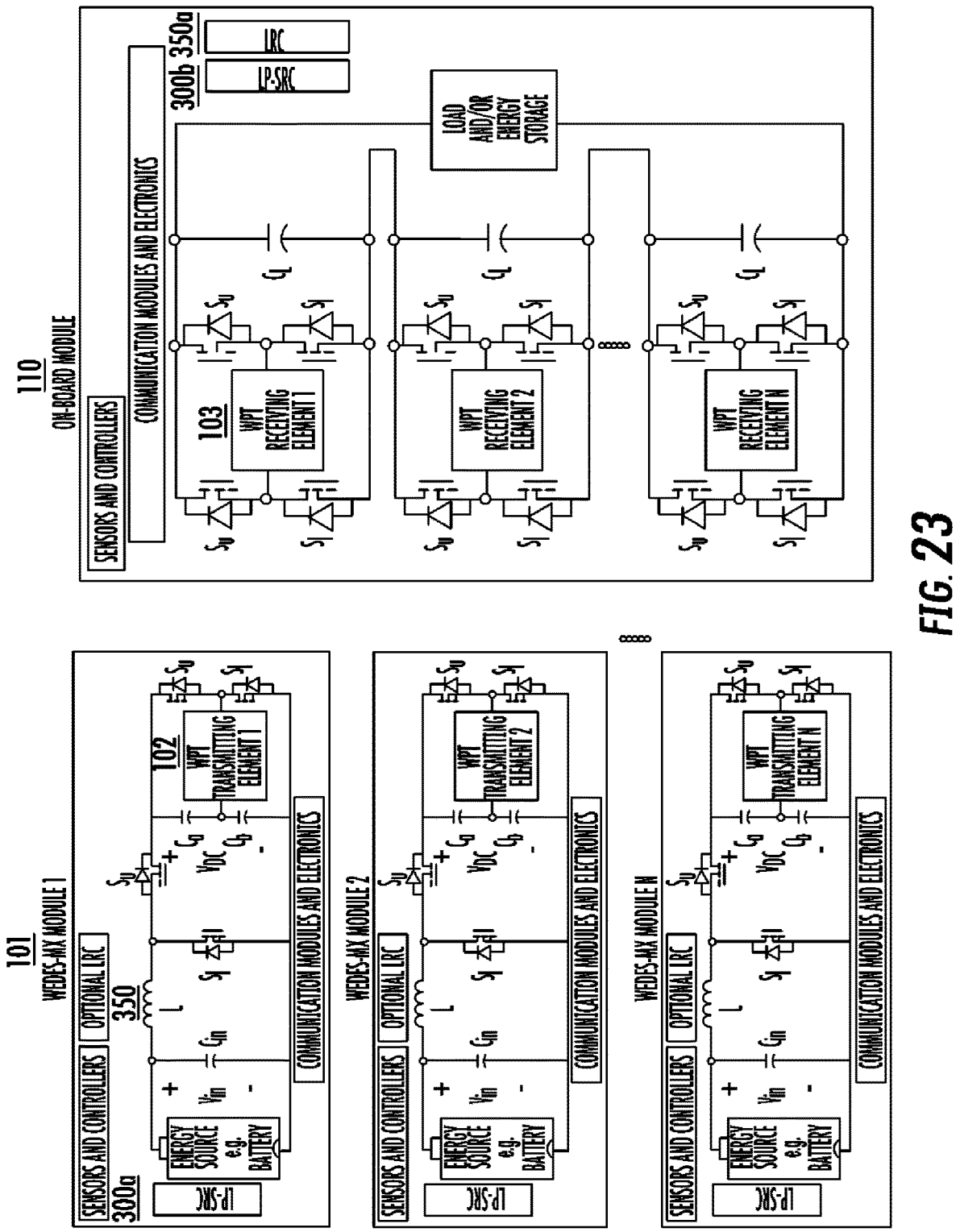
FIG. 23 is a block diagram of an example WEDES system according to implementations described herein.

In other implementations, the WEDES system can be part of an information or collaboration social network (or website). For example, the CDC unit 150 can collect and/or calculate data (e.g., operating parameters and/or power/energy management parameters) according to implementations described herein. Module-specific data for each WEDES-MX module 101 can be stored in a structured manner (e.g., in a database maintained by CDC unit 150) by associating respective data with a unique identifier for each of the WEDES-MX modules. A user can access information related to WEDES-MX modules (e.g., ones in their possession or new modules) stored by the CDC unit 150 over a communication network (e.g., the Internet), for example, using user credentials (e.g., user name/password). This disclosure contemplates that the user can access information related to specific WEDES-MX modules using a web browser, desktop application, or mobile application. An example user interface for the web browser, desktop application, or mobile application is shown in FIG. 17.

This disclosure contemplates that users can share a real-time status of the energy available in each WEDES-MX module 101 they have in their EV, home, etc., as well as WEDES-MX modules 101 at retail operations (e.g., shown in FIG. 9) such as charging stations. The location of each WEDES-MX module 101 are shared based on GPS data, for example. Optionally, this information can be used to collaborate on finding the closest place to swap the WEDES-MX modules 101. Optionally, this information can be used to find the place that has lower cost to exchange the WEDES-MX modules 101. Alternatively or additionally, users can collaborate and help each other (or make business) by providing their WEDES-MX modules 101 to others. Optionally, users can discuss related topic on this network.

According to yet other implementation, an example method can include receiving, at a remote server (e.g., CDC unit 150), data comprising one or more respective operating parameters and respective unique identifiers for a plurality of wireless power modules (e.g., WEDES-MX modules 101). This data is received over a wireless data link. For example, as described herein, data is exchanged among the WEDES-MX modules 101, the OB module 110, and the CDC unit 150 as described herein (e.g., example data exchange in shown in FIG. 2). The method can also include storing, in memory at the remote server, the one or more respective operating parameters, and calculating respective power/energy management parameters for the wireless power modules using the one or more respective operating parameters. The method can further include receiving, at the remote server, a request from a user over the wireless data link. In response to the request, the method can include calculating charging and pricing factors for at least one of the wireless power modules. Additionally, the method can include providing, over the wireless data link, the charging and pricing factors for the at least one of the wireless power modules to the user. Alternatively or additionally, the method can further include receiving, at the remote server, location data associated with the at least one of the wireless power modules. Optionally, the charging and pricing factors can be calculated using the location data associated with the at least one of the wireless power modules. Alternatively or additionally, the method can further include providing information to the user about a location for re-charging the at least one of the wireless power modules. Alternatively or additionally, the method can further include providing a user interface (e.g., shown in FIG. 17) for displaying at least one of the one or more respective operating parameters, the respective power/energy management parameters, or the charging and pricing factors. Alternatively or additionally, the method can further include receiving, at the remote server, respective unique identifiers for each the wireless power modules.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for distributing power across a wireless medium, the system comprising:
   a plurality of wireless modular power packs connected across the wireless medium to a wireless power receiver circuit that is connected to a load, wherein each wireless modular power pack comprises a respective wireless power transmission circuit directing a respective wireless power signal to the wireless power receiver circuit; and
   a respective power source positioned within each of the wireless modular power packs and transmitting a respective power signal across an internal power interface to a respective wireless power transmission circuit within a respective wireless modular power pack, wherein the wireless power receiver circuit synchronizes the respective wireless power signals transmitted from the wireless modular power packs and combines the respective wireless power signals into an output power signal connected to the load.

2. The system of claim 1, wherein each wireless modular power pack is independently removable from the system without interrupting power transmission from other wireless modular power packs in operation and without interrupting power supply to the load.

3. The system of claim 1, wherein each wireless modular power pack comprises an enclosure housing the respective power source.

4. The system of claim 1, further comprising a slotted rack defining respective slots for each of the wireless modular power packs, wherein each wireless modular power pack is equipped with a sliding mechanism to slide in a respective slot.

5. The system of claim 4, further comprising additional slotted racks housing additional wireless modular power packs, the additional slotted racks located remotely from the slotted rack.

6. The system of claim 1, wherein the wireless modular power packs and the wireless power receiver circuit are positioned proximate each other, and the wireless modular power packs are positioned in respective positions to minimize interference and attenuation between the wireless modular power packs and the wireless power receiver circuit, wherein the distance between the wireless modular power packs and the wireless power receiver circuit is so dimensioned to accommodate wireless power transmission there between, wherein the wireless power transmission comprises one of inductive resonance transmission, capacitive transmission, radiofrequency (RF) power transmission, ultrasonic transmission, or light transmission.

7. The system of claim 1, wherein the respective power source positioned within each of the wireless modular power packs is a battery, a solar cell, a super or ultra capacitor, a hydrogen cell, a nuclear/atomic power cell, a windmill, or a fuel cell.

8. The system of claim 1, wherein the wireless modular power packs are configured to transmit or receive multi-directional wireless power in any direction between the wireless modular power packs, the load, a charging pad or station, an external power source, or another power system.

9. The system of claim 1, wherein the wireless power receiver circuit synchronizes the respective wireless power signals via inverter and converter circuits.

10. The system of claim 9, wherein the respective wireless power transmission circuits and the wireless power receiver circuit each comprise the inverter and converter circuits accomplishing a DC to DC power conversion to emit a respective regulatory signal, a DC to AC inversion to transmit a respective wireless power signal, and either an AC to DC conversion or AC to AC conversion to emit the output power signal.

11. The system of claim 1, further comprising a wireless power transceiver charging unit positioned proximately to the respective wireless power transmission circuits and the wireless power receiver circuit.

12. A system for distributing power across a wireless medium, the system comprising:
   a plurality of wireless modular power packs connected across the wireless medium to a wireless power receiver circuit that is connected to a load, wherein each wireless modular power pack comprises a respective wireless power transmission circuit directing a respective wireless power signal to the wireless power receiver circuit;
   a respective power source positioned within each of the wireless modular power packs and transmitting a respective power signal across an internal power interface to a respective wireless power transmission circuit within a respective wireless modular power pack;
   a respective wireless data transceiver positioned within each of the wireless modular power packs, wherein the respective wireless data transceiver is configured to transmit one or more operating parameters of the respective power source over a wireless data link; and
   a control unit in electronic communication with the wireless modular power packs over the wireless data link, the control unit comprising a processor and a memory in operable communication with the processor, the memory having computer-executable instructions stored thereon that, when executed by the processor, cause the processor to:

receive the one or more operating parameters and store in the memory the one or more operating parameters; and select a power distribution allocation from the wireless modular power packs depending upon a respective condition of each of the wireless modular power packs, wherein selecting the power distribution allocation from the wireless modular power packs depending upon the respective condition of each of the wireless modular power packs comprises determining discharge and charge rates, determining scaling factors for power usage, or selectively disabling one or more of the wireless modular power packs.

13. The system of claim 12, wherein the one or more operating parameters of the respective power source comprise voltage, current, power converter/inverter output voltage, temperature, or impedance.

14. The system of claim 12, wherein the memory has further computer-executable instructions stored thereon that, when executed by the processor, cause the processor to calculate a power/energy management parameter using the one or more operating parameters of the respective power source.

15. The system of claim 14, wherein the power/energy management parameter comprises a state of charge (SOC) condition, a state of health (SOH) condition, or a capacity of the respective power source.

16. The system of claim 12, wherein the memory has further computer-executable instructions stored thereon that, when executed by the processor, cause the processor to receive and store a unique identifier associated with at least one of the wireless modular power packs.

17. The system of claim 12, wherein the respective wireless data transceivers are in electronic communication with a remote server.

18. The system of claim 17, wherein the memory has further computer-executable instructions stored thereon that, when executed by the processor, cause the processor to receive from the remote server, via at least one of the respective wireless data transceivers, information concerning at least one of the wireless modular power packs.

19. The system of claim 12, wherein the processor is in electronic communication with a multi-directional controller and the multi-directional controller is in electronic communication with the wireless modular power packs and the wireless power receiver circuit, wherein transmission and receipt of multi-directional power and multi-directional data extends in any direction between the wireless modular power packs, a slot host, a charging pad, a charging station, another vehicle, another data system, or another power system.

20. The system of claim 12, wherein the respective power source positioned within each of the wireless modular power packs is a battery, a solar cell, a super or ultra capacitor, a hydrogen cell, a nuclear/atomic power cell, a windmill, or a fuel cell.

21. A system for distributing power across a wireless medium, the system comprising:

a plurality of wireless modular power packs connected across the wireless medium to a wireless power receiver circuit that is connected to a load, wherein each wireless modular power pack comprises a respective wireless power transmission circuit directing a respective wireless power signal to the wireless power receiver circuit;

a respective power source positioned within each of the wireless modular power packs and transmitting a respective power signal across an internal power interface to a respective wireless power transmission circuit within a respective wireless modular power pack;

a respective wireless data transceiver positioned within each of the wireless modular power packs, wherein the respective wireless data transceiver is configured to transmit one or more operating parameters of the respective power source over a wireless data link; and a control unit in electronic communication with the wireless modular power packs over the wireless data link, the control unit comprising a processor and a memory in operable communication with the processor, the memory having computer-executable instructions stored thereon that, when executed by the processor, cause the processor to:

receive the one or more operating parameters and store in the memory the one or more operating parameters; and select a power distribution allocation from the wireless modular power packs depending upon a respective condition of each of the wireless modular power packs, wherein selecting the power distribution allocation from the wireless modular power packs depending upon the respective condition of each of the wireless modular power packs comprises setting a respective power converter/inverter reference voltage, current, power, or energy for each of the wireless modular power packs.

22. The system of claim 21, wherein the one or more operating parameters of the respective power source comprise voltage, current, power converter/inverter output voltage, temperature, or impedance.

23. The system of claim 21, wherein the memory has further computer-executable instructions stored thereon that, when executed by the processor, cause the processor to calculate a power/energy management parameter using the one or more operating parameters of the respective power source.

24. The system of claim 21, wherein the respective wireless data transceivers are in electronic communication with a remote server, wherein the memory has further computer-executable instructions stored thereon that, when executed by the processor, cause the processor to receive from the remote server, via at least one of the respective wireless data transceivers, information concerning at least one of the wireless modular power packs.

25. The system of claim 21, wherein the processor is in electronic communication with a multi-directional controller and the multi-directional controller is in electronic communication with the wireless modular power packs and the wireless power receiver circuit, wherein transmission and receipt of multi-directional power and multi-directional data extends in any direction between the wireless modular power packs, a slot host, a charging pad, a charging station, another vehicle, another data system, or another power system.

26. The system of claim 21, wherein the respective power source positioned within each of the wireless modular power packs is a battery, a solar cell, a super or ultra capacitor, a hydrogen cell, a nuclear/atomic power cell, a windmill, or a fuel cell.

27. A system for distributing power across a wireless medium, the system comprising:

a plurality of wireless modular power packs connected across the wireless medium to a wireless power receiver circuit that is connected to a load, wherein each wireless modular power pack comprises a respective wireless power transmission circuit directing a respective wireless power signal to the wireless power receiver circuit;

a respective power source positioned within each of the wireless modular power packs and transmitting a respective power signal across an internal power interface to a respective wireless power transmission circuit within a respective wireless modular power pack;

a respective wireless data transceiver positioned within each of the wireless modular power packs, wherein the respective wireless data transceiver is configured to transmit one or more operating parameters of the respective power source over a wireless data link; and a control unit in electronic communication with the wireless modular power packs over the wireless data link, the control unit comprising a processor and a memory in operable communication with the processor, the memory having computer-executable instructions stored thereon that, when executed by the processor, cause the processor to receive the one or more operating parameters and store in the memory the one or more operating parameters, wherein the wireless power receiver circuit synchronizes the respective wireless power signals transmitted from the wireless modular power packs and combines the respective wireless power signals into an output power signal connected to the load.

28. The system of claim 27, wherein the wireless modular power packs are configured to transmit or receive multi-directional wireless power in any direction between the wireless modular power packs, the load, a charging pad or station, an external power source, or another power system.

29. The system of claim 27, wherein the respective power source positioned within each of the wireless modular power packs is a battery, a solar cell, a super or ultra capacitor, a hydrogen cell, a nuclear/atomic power cell, a windmill, or a fuel cell.

* * * * *